United States Patent
Kioka et al.

[11] Patent Number: 5,948,872
[45] Date of Patent: *Sep. 7, 1999

[54] SOLID TITANIUM CATALYST COMPONENT FOR OLEFIN POLYMERIZATION OLEFIN POLYMERIZATION CATALYST PREPOLYMERIZED POLYOLEFIN-CONTAINING CATALYST AND METHOD OF OLEFIN POLYMERIZATION

[75] Inventors: Mamoru Kioka; Tetsunori Shinozaki, both of Kuga-gun, Japan

[73] Assignee: Mitsui Chemicals, Inc., Tokyo, Japan

[ * ] Notice: This patent is subject to a terminal disclaimer.

[21] Appl. No.: 08/989,235

[22] Filed: Dec. 12, 1997

Related U.S. Application Data

[62] Division of application No. 08/772,885, Dec. 24, 1996, Pat. No. 5,726,262, which is a continuation of application No. 08/369,288, Jan. 6, 1995, abandoned, which is a continuation of application No. 08/104,494, Aug. 10, 1993, abandoned, which is a continuation-in-part of application No. 07/684,256, Apr. 12, 1991, abandoned.

[30] Foreign Application Priority Data

Apr. 13, 1990 [JP] Japan .................................. 2-97902
Apr. 13, 1990 [JP] Japan .................................. 2-97906
Apr. 13, 1990 [JP] Japan .................................. 2-97910
Apr. 13, 1990 [JP] Japan .................................. 2-97911

[51] Int. Cl.$^6$ ........................................ C08F 4/64
[52] U.S. Cl. ........................... 526/124.8; 526/125.3; 526/125.6; 526/142; 526/153; 526/351; 526/904; 502/110; 502/114; 502/121; 502/122; 502/123; 502/126

[58] Field of Search .......................... 526/124.8, 125.3, 526/125.6, 142, 153, 351, 904; 502/110, 114, 121, 122, 123, 126

[56] References Cited

U.S. PATENT DOCUMENTS 4,978,648  12/1990  Barbe et al. ........................... 502/127

*Primary Examiner*—David W. Wu
*Attorney, Agent, or Firm*—Sherman and Shalloway

[57] ABSTRACT

A solid titanium catalyst component [Ia] containing magnesium, halogen, titanium and a compound having at least two ether linkags with a plurality of intermediately existing bonding atoms; a catalyst and a prepolymerized olefin-containing catalyst prepared by using the solid titanium catalyst component [Ia]; a method for preparing a polyolefin wherein said catalyst or prepolymerized olefin containing catayst is used. A catalyst and a prepolymerized olefin containing catalyst prepared by using a solid titanium catalyst component [Ib] containing magnesium, halogen, titanium and a specific electron donor (al), and a compound having at least two ether linkags with a plurality of intermediately existing bonding atoms; a method for preparing a polyolefin wherein said catalyst or prepolymerized olefin containing catayst is used. By virtue of the use of the catalysts or the prepolymerized olefin-containing catalysts, the polymerization reaction efficiently proceeds with high catalytic activity, giving polymers high in stereospecificity.

4 Claims, 5 Drawing Sheets

5,948,872

SOLID TITANIUM CATALYST COMPONENT FOR OLEFIN POLYMERIZATION OLEFIN POLYMERIZATION CATALYST PREPOLYMERIZED POLYOLEFIN-CONTAINING CATALYST AND METHOD OF OLEFIN POLYMERIZATION

CROSS-REFERENCE TO RELATED APPLICATIONS

This application is a division of application Ser. No. 08/772,885, filed Dec. 24, 1996 now U.S. Pat. No. 5,726,262; which is a continuation of application Ser. No. 08/369,288, filed Jan. 6, 1995 now abandoned; which is a continuation of application Ser. No. 08/104,494, filed Aug. 10, 1993 now abandoned; which is a continuation-in-part of application Ser. No. 07/684,256, filed Apr. 12, 1991 now abandoned.

FIELD OF THE INVENTION

This invention relates to solid catalyst components, prepolymerized polyolefin-containing catalysts, catalysts and method of polymerization for the preparation of homopolymer of ethylene or α-olefin, or copolymers thereof.

BACKGROUND OF THE INVENTION

Catalysts containing activated titanium compounds supported by magnesium halides are hitherto known as those for use in the preparation of homopolymer of ethylene or α-olefin, or olefin polymers such as an ethylene/α-olefin copolymers.

The olefin polymerization catalysts as referred to above (hereinafter they are sometimes used, including also copolymerization catalysts) are known to include such catalysts as comprising a solid titanium catalyst component containing magnesium, titanium, halogen and an electron donor, and an organometallic compound catalyst component.

The catalysts mentioned above have high activities in polymerization or copolymerization of α-olefin such as propylene or butene-1 (hereinafter the term polymerization is sometimes used, including also copolymerization) as well as In polymerization of ethylene. In addition thereto, the polymers or copolymers obtained by the use of these catalysts are high in stereospecificity.

Of the catalysts as mentioned above, those comprising in particular a solid titanium catalyst component having supported thereon an electron donor selected from carboxylic esters, a typical example of which is phthalic ester, an aluminum-alkyl compound as a co-catalyst and a silicon compound having at least one Si-OR linkage (wherein R is a hydrocarbon radical) exhibit excellent performance when they are used in the above-mentioned polymerization or copolymerization.

The present inventors conducted researches with the view of obtaining olefin polymerization catalysts excellent by far in polymerization activity and stereospecificity, and have eventually accomplished the present invention on the basis of their finding that an object of the invention can be best attained by using a catalyst comprising a solid titanium catalyst component containing magnesium, halogen, titanium and a compound having two or more ether linkages with a plurality of intermediately existing bonding atoms, or a catalyst comprising a solid titanium catalyst component containing magnesium, titanium, halogen and an electron donor, an organometallic compound and the above-mentioned compound having two or more ether linkages.

In this connection, it has been found that polymers low in stereospecificity are obtained by the use of a catalyst system comprising a solid catalyst component obtained by contact of a solid component containing magnesium, titanium, halogen atom and an electron donor with an alkoxy-containing aromatic compound having 1–6 alkoxy groups substituted in the benzene ring, in combination with an organoaluminum compound (Japanese Patent L-O-P Publn. No. 236203/1989).

OBJECT OF THE INVENTION

The present invention has been made in view of such circumstances as mentioned above, and an object of the invention is to provide a solid titanium catalyst component, a prepolymerized polyolefin-containing catalyst and a olefin polymerization catalyst, which are prepared by using a specific electron donor, high in catalytic activity and capable of giving olefin (co-)polymers high in stereospecificity, and methods of olefin polymerization using said olefin polymerization catalysts.

SUMMARY OF THE INVENTION

The first solid titanium catalyst component [I] for use in olefin polymerization of the present invention is characterized in that said catalyst component is formed by bringing (A) a solid titanium component containing titanium, magnesium, halogen and an electron donor ($a_0$) into contact with (B) an electron donor ($b_0$), wherein either the electron donor ($a_0$) or electron donor ($b_0$) is a compound having two or more ether linkages with a plurality of intermediately existing bonding atoms.

By using the above-mentioned compound having two or more ether linkages as an electron donor in the solid titanium catalyst component of the invention, it is possible to obtain an olefin polymerization catalyst which is high in activity even when an electron donor is not used further at the time of polymerization and capable of giving polymers high in stereospecificity.

Furthermore, by virtue of the presence of the solid titanium catalyst component of the invention, it is possible to obtain an olefin polymerization catalyst which is capable of giving polymers higher by far in stereospecificity by using the above-mentioned compound having two or more ether linkages or a specific electron donor at the time of polymerization.

The first olefin polymerization catalyst of the invention is characterized in that said catalyst is formed from;

[I] a solid titanium catalyst component for use in olefin polymerization formed by bringing (A) a solid titanium component containing titanium, magnesium, halogen and an electron donor ($a_0$) into contact with (B) an electron donor ($b_0$), either said electron donor ($a_0$) or electron donor ($b_0$) being a compound having at least two ether linkages with a plurality of intermediately existing bonding atoms,

[IIa] an organometallic compound catalyst component containing a metal selected from among those belonging to Groups I–III of the periodic table and, if necessary,

[III] an electron donor (c) including the compound having at least two ether linkages.

The first method of olefin polymerization of the invention is characterized by polymerizing or copolymerizing ethylene and/or α-olefin in the presence of the first olefin polymerization catalyst mentioned above.

By virtue of the use of the first olefin polymerization catalyst comprising the components [I] and [IIa] in the first method of olefin polymerization of the invention, the polymerization reaction efficiently proceeds with high catalytic activity, giving polymers high in stereospecificity.

In that case, when the catalyst used contains the above compound containing at least two ether linkages and/or a specific electron donor, namely, electron doner (c) [III] in addition to the components [I] and [IIa], the polymers obtained are higher by far in stereospecificity.

The second olefin polymerization catalyst of the invention contains

[Ia] a solid titanium catalyst component containing titanium, magnesium, halogen and a compound having at least two ether linkages with a plurality of intermediately existing bonding atom, and

[IIb] an organoaluminum compound catalyst component consisting of an organoaluminum compound containing halogen and an organoaluminum containing no halogen.

The second method of olefin polymerization of the invention comprises polymerizing ethylene and/or α-olefin in the presence of the second olefin polymerization catalyst of the invention.

By virtue of the use of the second olefin polymerization catalyst comprising the components [Ia] and [IIb], the polymerization reaction efficiently proceeds with high catalytic activity, giving polymers high in stereospecificity.

In that case, when the catalyst used contains the above-mentioned electron donor (c) in addition to the components [Ia] and [IIb], the polymers obtained are higher by far in stereospecificity.

The third olefin polymerization catalyst of the invention contains

[Ib] a solid titanium catalyst component containing titanium, magnesium, halogen and an electron donor $(a_1)$ (this electron donor $(a_1)$ does not include a compound having at least two ether linkages with a plurality of intermediately existing bonding atoms),

[IIb] an organoaluminum compound catalyst component consisting of an organoaluminum compound containing halogen and an organoaluminum compound containing no halogen, and

[IIIa] a compound having at least two ether linkages with a plurality of intermediately existing bonding atoms.

The third method of olefin polymerization of the invention comprises polymerizing or copolymerizing ethylene and/or α-olefin in the presence of the third olefin polymerization catalyst of the invention.

By virtue of the use of the third olefin polymerization catalyst comprising the components [Ib], [IIb] and [IIIa] in the third method of olefin polymerization of the invention, the polymerization reaction efficiently proceeds with high catalytic activity, giving polymers high in stereospecificity.

The first prepolymerized polyolefin-containing catalyst of the invention is prepared by prepolymerizing olefin on an olefin polymerization catalyst formed from a solid titanium catalyst component [Ia] containing titanium, magnesium, halogen and a compound having at least two ether linkages with a plurality of intermediately existing bonding atoms, and an organometallic compound catalyst component [IIa] containing a metal selected from among those belonging to Groups I–III of the periodic table.

By virtue of the use of the first prepolymerized polyolefin-containing catalyst of the invention, it is possible to obtain an olefin polymerization catalyst which is high in activity even when an electron donor is further used at the time of polymerization (unless specified otherwise in the present invention, this electron donor does not include the above-mentioned compound having at least two ether linkages), and capable of giving polymers high in stereospecificity.

The fourth olefin polymerization catalyst of the invention contains [Ia–IIa] the first prepolymerized polyolefin-containing catalyst, [IIa] an organometallic compound catalyst component containing a metal selected from among those belonging to Groups I–III of the periodic table and, if necessary, [III] the above-mentioned electron donor (c).

The fourth method of olefin polymerization of the invention comprises polymerizing ethylene and/or α-olefin in the presence of the fourth olefin polymerization catalyst of the invention.

By virtue of the use of the fourth olefin polymerization catalyst comprising the components [Ia–IIa] and [IIa] in the fourth method of olefin polymerization of the invention, the polymerization reaction efficiently proceeds with high catalytic activity, giving polymers high in stereospecificity.

In that case, when the catalyst used contains the above-mentioned electron donors (c) in addition to the above-mentioned two components, the polymers obtained are higher by far in stereospecificity.

The second prepolymerized polyolefin-containing catalyst of the invention is prepared by polymerizing olefin on an olefin polymerization catalyst formed from [Ib] a solid titanium catalyst component containing titanium, magnesium, halogen and an electron donor $(a_1)$, [IIa] an organometallic compound catalyst component containing a metal selected from among those belonging to Groups I–III of the periodic table and [IIIa] the above-mentioned compound having at least two ether linkages.

By virtue of the use of the second prepolymerized polyolefin-containing catalyst of the invention, it is possible to obtain an olefin polymerization catalyst which is high in activity even when an electron donor is further used at the time of polymerization, and capable of giving the polymers high in stereospecificity.

The fifth olefin polymerization catalyst of the invention contains [Ib-IIa-IIIa] the second prepolymerized polyolefin-containing catalyst, [IIa] an organometallic compound catalyst component containing a metal selected from among those belonging to Groups I–III of the periodic table and, if necessary, [III] the above-mentioned electron donor (c) including the compound having at least two ether linkages.

The fifth method of olefin polymerization of the invention comprises polymerizing or copolymerizing ethylene and/or α-olefin in the presence of the fifth olefin polymerization catalyst of the invention.

By virtue of the use of the fifth olefin polymerization catalyst in the fifth method of olefin polymerization of the invention, the polymerization reaction efficiently proceeds with high catalytic activity, giving polymers high in stereospecificity in that case, when the organometallic compound [IIa] and [III].the electron donor (c) are used in addition to the prepolymerized olefin-containing catalyst [Ib-IIa-III].

The sixth method of olefin polymerization of the invention comprises a step of carryng out polymerization or copolymerization of at least one alpha-olefin selected from those among alpha-olefins having not less than 2 carbon atoms to obtain a polymer or copolymer containing not less than 70% of alpha-olefin having not less than 4 carbon atoms in the presence of an olefin polymerization catalyst formed from a solid titanium catalyst component [Ia] containing titanium, magnesium, halogen and a compound having at least two ether linkages with a plurality of intermediately existing bonding atoms, and an organometallic compound catalyst component [IIa] containing a metal selected from among those belonging to Groups I–III of the periodic table.

By virtue of the use of the olefin polymerization catalyst containing the above solid titanium catalyst component [Ia] and the above organometallic compound catalyst component [IIa] in the sixth method of olefin polymerization of the invention, the polymerization reaction efficiently proceeds with high catalytic activity, giving polymers high in stereospecificity.

The seventh method of olefin polymerization of the invention comprises a step of carryng out polymerization or copolymerization of at least one alpha-olefin selected from those among alpha-olefins having not less than 2 carbon atoms to obtain a polymer or copolymer containing not less than 70% of alpha-olefin having not less than 4 carbon atoms in the presence of an olefin polymerization catalyst formed from a solid titanium catalyst component [Ib] containing titanium, magnesium, halogen and a donor ($a_1$) provided that this electron donor ($a_1$) does not include a compound having at least two ether linkages with a plurality of intermediately existing bonding atoms, an organometallic compound catalyst component [IIa] containing a metal selected from among those belonging to Groups I–III of the periodic table and a compound having at least two ether linkages with a plurality of intermediately existing bonding atoms [IIIa].

By virtue of the use of the olefin polymerization catalyst containing the above solid titanium catalyst component [Ib] and the above organometallic compound catalyst component [IIa] and the above compound having at least two ether linkages [IIIa] in the seventh method of olefin polymerization of the invention, the polymerization reaction efficiently proceeds with high catalytic activity, giving polymers high in stereospecificity.

DETAILED DESCRIPTION OF THE INVENTION

Figure 1:
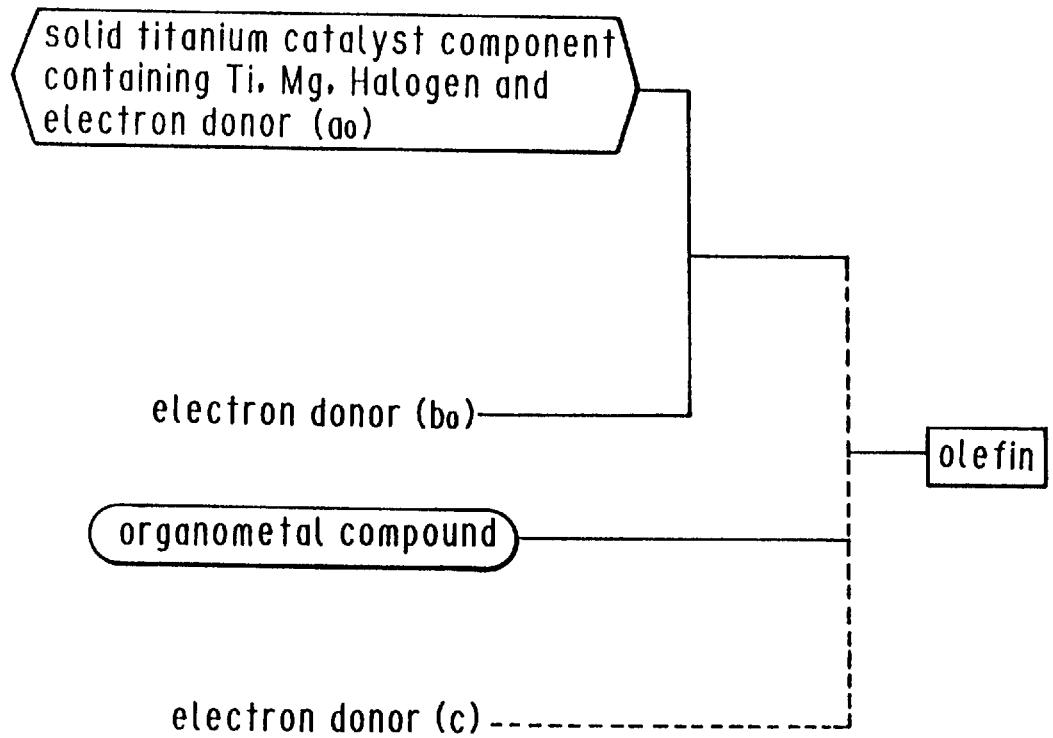
FIGS. 1–5 are given to illustrate concrete examples of the processes for the preparation of the first to fifth olefin polymerization catalysts.

The first to third olefin polymerization catalysts and catalysts used for the first and second prepolymerized polyolefin-containing catalysts and the sixth and seventh olefin polymerization method of the present invention are prepared by using specific solid titanium catalyst components [I], [Ia] and [Ib], respectively.

In the first olefin polymerization catalyst of the invention, the above-mentioned solid titanium catalyst component [I] of the present invention is used.

This solid titanium catalyst component [I] is obtained by the contact of a solid titanium component (A) containing titanium, magnesium, halogen and an electron donor ($a_0$) with an electron donor ($b_0$), wherein either said electron donor ($a_0$) or electron donor ($b_0$) is a compound having at least two ether linkages with a plurality of intermediately existing bonding atoms.

The first olefin polymerization catalyst of the invention is formed by the contact of this solid titanium catalyst component [I] with an organoaluminum catalyst component [IIa] which will be mentioned later.

The solid titanium component (A) used in the preparation of this solid titanium catalyst component [I] is prepared, for example, by bringing a magnesium compound, a titanium compound and the above-mentioned electron donor ($a_0$) into contact with one another, said electron donor ($a_0$) may be a compound having at least two ether linkages.

The magnesium compound used in the preparation of the solid titanium component (A) includes those having reducing ability or those having no reducing ability.

The magnesium compounds having reducing ability referred to above include, for example, organomagnesium compounds represented by the formula $X_nMgR_{2-n}$ wherein n is $0 \leq n < 2$, R is hydrogen, alkyl of 1–20 carbon atom, aryl or cycloalkyl, when n is 0, Rs may be the same or different, and X is halogen.

Concrete examples of such organomagnesium compounds as having reducing ability include dimethylmagnesium, diethylmagnesium, dipropylmagnesium, dibutylmagnesium, diamylmagnesium, dihexylmagnesium, didecylmagnesium, methylmagnesium chloride, propylmagnesium chloride, butylmagnesium chloride, hexylmagnesium chloride, amylmagnesium chloride, butylethoxymagnesium, ethylbutylmagnesium, octylbutylmagnesium, butylmagnesium hydride. These magnesium compounds exemplified above may be singly, or they may form complex compounds with organoaluminum compounds which will be mentioned later. These magnesium compounds used may be either a liquid or a solid.

Concrete examples of the magnesium compounds having no reducing ability include;

magnesium halides such as magnesium chloride, magnesium bromide, magnesium iodide and magnesium fluoride;

alkoxymagnesium halides such as methoxymagnesium chloride, ethoxymagnesium chloride, isopropoxymagnesium chloride, butoxymagnesium chloride and octoxymagnesium chloride;

aryloxymagnesium halides such as phenoxymagnesium chloride and methylphenoxymagnesium chloride;

alkoxymagnesiums such as ethoxymagnesium, isopropoxy magnesium, butoxymagnesium, n-octoxymagnesium and 2-ethylhexoxymagnesium;

aryloxymagnesiums such as phenoxymagnesium and dimethylphenoxymagnesium;

magnesium carboxylates such as magnesium laurate and magnesium stearate.

The magnesium compounds having no reducing ability exemplified above may be those derived from the above-mentioned magnesium compounds having reducing ability or may be those derived at the time of preparation of the catalyst component. The magnesium compounds having no reducing ability may be derived from the magnesium compounds having reducing ability, for example, by bringing the magnesium compounds having reducing ability into contact with a halogen containing compound or a compound having OH group or active carbon-oxygen bond such as polysiloxane compounds, halogen containing silane compounds, halogen containing aluminum compounds, esters or alcohols.

Besides the above-mentioned magnesium compounds having reducing ability or having no reducing ability, the magnesium compounds used for the purposes intended may be complex compounds or double compounds with other metals or mixtures with other metals. Furthermore, the magnesium compounds used may be mixtures of two or more kinds of the above-mentioned compounds, and they may be used either in a liquid or solid state. When the magnesium compounds used are solid, they may be liquefied with alcohols, carboxylic acids, aldehydes, amines and esters of metallic salts.

Of these magnesium compounds, preferred are those having no reducing ability, especially those containing halogen. Of the halogen containing magnesium compounds, preferred are magnesium chloride, alkoxy magnesium chloride and aryloxy magnesium chloride.

As the titanium compound used in the preparation of the solid titanium component (A), a titanium compound in the liquid state is preffered and includes, for example, tetravalent titanium compound represented by the general formula

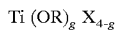

wherein R is a hydrocarbon radical, X is halogen, and $0 \leq g \leq 4$. More concretely, these titanium compounds in the lipuid state include titanium tetrahalide such as $TiCl_4$, $TiBr_4$ or $TiI_4$; alkoxy titanium trihalide such as $Ti(OCH_3)Cl_3$, $Ti(OC_2H_5)Cl_3$, $Ti(On\text{-}C_4H_9)Cl_3$, $Ti(OC_2H_5)Br_3$ or $Ti(Oiso\text{-}C_4H_9)Br_3$; alkoxy titanium dihalide such as $Ti(OCH_3)_2Cl_2$, $Ti(OC_2H_5)_2Cl_2$, $Ti(On\text{-}C_4H_9)_2Cl_2$ or $Ti(OC_2H_5)_2Br_2$; alkoxy titanium monohalide such as $Ti(OCH_3)_3Cl$, $Ti(OC_2H_5)_3Cl$, $Ti(On\text{-}C_4H_9)_3Cl$ or $Ti(OC_2H_5)_3Br$; and tetraalkoxy titanium such as $Ti(OCH_3)_4$, $Ti(OC_2H_5)_4$, $Ti(On\text{-}C_4H_9)_4$, $Ti(Oiso\text{-}C_4H_9)_4$, $Ti(O\text{-}2\text{-ethylhexyl})_4$, $Ti(OCH_3)_4$, $Ti(OC_2H_5)_4$, $Ti(On\text{-}C_4H_9)_4$, $Ti(Oiso\text{-}C_4H_9)_4$ or $Ti(o\text{-}2\text{-ethylhexyl})_4$.

Of these liquid titanium compounds exemplified above, preferred are titanium tetrahalides, especially titanium tetrachloride. These titanium compounds may be used either singly or in admixture, or may be used after dilution in hydrocarbon or halogenated hydrocarbon.

In the solid titanium component (A) used in the olefin polymerization catalyst of the invention, there is used a compound having at least two ether linkages with a plurality of intermediately existing bonding atoms and/or an electron donor ($a_1$) other than said compound having at least two ether linkages as an electron donor ($a_0$), in addition to the above-mentioned magnesium and titanium compounds.

The compound having at least two ether linkages used in the preparation of the solid titanium compound (A) of the invention includes those having the above intermediately existing bonding atoms composed of at least one kind of atom selected from among carbon, silicon, oxygen, sulfur, phosphorus and boron. Of these compounds mentioned above, preferred are those in which a relatively bulky substituent attaches to the atom intermediately existing between the ether linkages and a plurality of carbon atoms are contained in the atoms existing between at least two ether linkages.

Such compound having at least two ether linkages as mentioned above includes, for example, those represented by the following formula

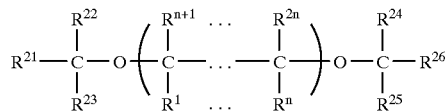

wherein n is an integer of $2 \leq n \leq 10$, $R^1$–$R^{26}$ are each a substituent having at least one element selected from among carbon, hydrogen, halogen, nitrogen, sulfur, phosphorus, boron and silicon, any of $R^1$–$R^{26}$, preferably $R^1$–$R^{2n}$ may form, together a ring other than a benzene ring, and the main chain of the compound may contain atoms other than carbon.

The compound having at least two ether linkages as illustrated above includes 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(l-naphthyl)-1,3-dimethoxypropane, 2-(2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-iso-propyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-iso-butyl-1,3-dimethoxypropane, 2-methyl-2-(2-ethylhexyl)-1,3-dimethoxypropane, 2,2-di-iso-butyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-di-iso-butyl-1,3-diethoxypropane, 2,2-di-iso-butyl-1,3-dibutoxypropane, 2-iso-butyl-2-iso-propyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-iso-propyl-2-iso-pentyl-1,3-dimethoxypropane, 2-phenyl-2-benzyl-1,3-dimethoxypropane, 2-cyclohexyl-2-cyclohexylmethyl-1,3-dimethoxypropane, 2,3-diphenyl-1,4-diethoxybutane, 2,3-dicyclohexyl-1,4-diethoxybutane, 2,2-dibenzyl-1,4-diethoxybutane, 2,3-dicyclohexyl-1,4-diethoxybutane, 2,3-di-iso-propyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-di-iso-propyl-1,5-dimethoxypentane, 2,4-di-iso-butyl-1,5-dimethoxypentane, 2,4-di-iso-amyl-1,5-dimethoxypentane, 3-methoxymethyltetrahydrofuran, 3-methoxymethyldioxane, 1,3-di-iso-amyloxypropane, 1,2-di-iso-butoxypropane, 1,2-di-iso-butoxyethane, 1,3-di-iso-amyloxyethane, 1,3-di-iso-amyloxypropane, 1,3-di-iso-neopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro[5,5]undecane, 3,7-dioxabicyclo[3,3,1]nonane, 3,7-dioxabicyclo[3,3,0]octane, 3,3-di-iso-butyl-1,5-oxononane, 6,6-di-iso-butyldioxyheptane, 1,1-dimethoxymethylcyclopentane, 1,1-bis(dimethoxymethyl)cyclohexane, 1,1-bis(methoxymethyl)bicyclo[2,2,1]heptane, 1,1-dimethoxymethylcyclopentane, 2-methyl-2-methoxymethyl-1,3-dimethoxypropane, 2-cyclohexyl-2-ethoxymethyl-1,3-dimethoxypropane, 2-cyclohexyl-2-methoxyethyl-1,3-dimethoxypropane, 2,2-di-iso-butyl-1,3- dimethoxycyclohexane, 2-iso-propyl-2-iso-amyl-1,3-dimethoxycyclohexane, 2-cyclohexyl-2-methoxymethyl-1,3-diethoxycyclohexane, 2-iso-propyl-2-methoxymethyl-1,3-dimethoxycyclohexane, 2-iso-butyl-2-methoxymethyl-1,3-dimethoxycyclohexane, 2-cyclohexyl-2-ethoxymethy-1,3-diethoxycyclohexane, 2-cyclohexyl-2-ethoxymethyl-1,3-dimethoxycyclohexane, 2-iso-propyl-2-ethoxymethyl-1,3-diethoxycyclohexane, 2-iso-propyl-2-ethoxymethyl-1,3-dimethoxycyclohexane, 2,-iso-butyl-2-ethoxymethyl-1,3-diethoxycyclohexane, 2-iso-butyl-2-ethoxymethyl-1,3-dimethoxycyclohexane, tris(p-methoxyphenyl)phospine, methlphenylbis(methoxymethyl)silane, diphenylbis(methoxymethyl)silane, methylcyclohexylbis(methoxymethyl)silane, di-t-butylbis(methoxymethyl)silane, cyclohexyl-t-butylbis(methoxymethyl)silane and iso-propyl-t-butylbis(methoxymethyl)silane.

Of these compounds, preferred are 1,3-diethers, espesially, 2,2-di-iso-butyl-1,3-dimethoxypropane, 2-iso-propyl-2-iso-pentyl-1,3-dimethoxypropane, 2,2-dicyclohexyl-1,3 dimethoxypropane and 2,2-bis (cyclohexylmethyl)1,3-dimethoxypropane.

The electron donor ($a_1$) used in the solid titanium component (A) in addition to the above-mentioned compound 1 0 having at least two ether linkages includes organic ester, organic acid halide, organic acid anhydride, ether, ketone, aldehyde, tertiary amine, phosphorous ester, phosphate ester, phosphate amide, carboxylic acid amide, nitryl. The concrete examples of the above compounds include ketones having 3–15 of carbon atoms such as acetone, methyl ethyl ketone, methyl iso-butyl ketone, acetophenone, benzophenone, cyclohexanone and benzoquinone; aldehydes having 2–15 of carbon atoms such as acetaldehyde, propionaldehyde, octylaldehyde, benzaldehyde, tolualdehyde and naphthoaldehyde; organic esters such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl methoxybenzoate, gamma-butyrolactone, sigmmavalerolactone, coumarin, phthalide and ethyl carbonate; acid halides having 2–15 of carbon atoms such as acetyl chloride, benzoly chloride, toluic acid chloride and anisic acid chloride; ethers having 2–20 of carbone atoms such as methyl ether, ethyl ether, iso-propyl ether, butyl ether, amyl ether, tetrahydrofrane, anysole and diphenyl ether; acid amides such as N,N-dimethylacetoamide, N,N-diethylbenzoamide and N,N-dimetyl-tolylamide; tartiary amines such as trimethylamine, triethylamine, tributylamine, tribenzylamine, and tetramethylethyldiamine, and of these compounds exemplified above, preferred are aromatic carboxylic acid esters. These compounds may be used in combination of two or more.

Furthermore, polycarboxylic acid esters may be mentioned as particularly preferred examples of the organic acid esters mentioned above, and they include such compounds as having a skeleton represented by the following general formula.

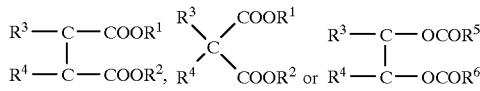

wherein $R^1$ is a substituted or unsubstituted hydrocarbon radical, $R^2$, $R^5$ and $R^6$ are each hydrogen or a substituted or unsubstituted hydrocarbon radical, $R^3$ and $R^4$ are each hydrogen or a substituted or unsubstituted hydrocarbon radical, preferably at least one of $R^2$, $R^5$ and $R^6$, and at least one of $R^3$ and $R^4$ is a substituted or unsubstituted hydrocarbon radical, $R^3$ and $R^4$ may be connected to each other, and when $R^1$–$R^6$ are each a substituted hydrocarbon radical, the substituent thereof includes such groups as containing at least one atom different from carbon atom such as N, O, or S, for example, C—O—C, COOR, COOH, OH, $SO_3H$, —C—N—C— and $NH_2$.

Such polycarboxylic acid esters as illustrated above include concretely; aliphatic polycarboxylates such as diethyl succinate, dibutyl succinate, diethyl methylsuccinate, di-iso-butyl alpha-methylglutamate, diethyl methylmalonate, diethyl ethylmalonate, diethyl iso-propylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, di-iso-propyl beta-metylglutarate, diallyl ethylsuccinate, di-2-ethylhexyl fumarate diethyl itaconate and dioctyl citrate; cycloaliphatic polycarboxylates suh as diethyl 1,2-cyclohexanecarboxylate, di-iso-butyl 1,2-cyclohexanecarboxylate, diethyl tetrahydrophthalate and diethyl nadate; aromatic polycaroxylates such as monoethyl phthalate, dimethyl phthalate, methylethyl phthalate, mono-iso-butyl phthalate, diethyl phthalate, ethyl-iso-butyl phthalate, di-n-propyl phthalate, di-iso-propyl phthalate, di-n-butyl phthalate, di-iso-butyl phthalate, di-n-heptyl phthalate, di-2-ethyhexyl phthalate, di-n-octyl phthalate, dineopentyl phthalate, didecyl phthalate, benzylbutyl phthalate, diphenyl phthalate, diethyl naphtalenedicarboxylate, dibutyl naphthalene dicarboxylate, triethyl trimellitate, dibutyl trimellitate; and heterocyclicpolycarboxylates such as 3,4-furane dicarboxylate.

Examples of polycarboxylic acid esters other than those exemplified above include long dicarboxylic acid esters such as diethyl adipate, di-iso-butyl adipate, di-iso-propyl sebacate, di-n-butyl sebacate, di-n-octyl sebacate, di-2-ethylhexyl sebacate. Of these compounds exemplified above, preferred are carboxylic acid esters, especially polycarboxylic acid esters and, in particular, phthalic esters.

The solid titanium component (A) used in the invention may also be prepared by bringing the above-mentioned magnesium compound, liquid titanium compound and electron donor ($a_0$) into contact with a carrier compound and an organic and inorganic compound containing silicon, phosphorus or aluminum used as a reaction assistant.

As the carrier compound referred to above, there may be mentioned $Al_2O_3$, $SiO_2$, $B_2O_3$, MgO, CaO, $TiO_2$, ZnO, $ZnO_2$, $SnO_2$, BaO, ThO, and such resins as styrene/divinylbenzene copolymers. Of these carrier compounds, preferred are, $Al_2O_3$, $SiO_2$ and styrene/divinylbenzene copolymers.

The electron donor ($a_0$) is not always used as a starting material, and it may also be formed in the course of preparation of the solid titanium component (A).

The solid titanium component (A) used in the invention is prepared by bringing the above-mentioned magnesium compound, liquid titanium compound and electron donor ($a_0$) into contact with one another.

Briefly set below, by way of illustration but not of limitation, are several examples of the process for the preparation of the solid titanium component (A).

(1) A process wherein the above-mentioned magnesium compound, compound having at least two ether linkages, and titanium compound are brought into contact with one another in any order, and the contacted mixture is allowed to undergo reaction. In carrying out this reaction, each reactant may be pretreated with a reaction assistant such as the compound having at least two ether linkages and/or the electron donor ($a_1$), an organoaluminum compound or a halogen containing silicon compound.

(2) A process wherein a liquid magnesium compound having no reducing ability is allowed to react with a liquid titanium compound in the presence of the above-mentioned compound having at least two ether linkages, thereby depositing a solid magnesium titanium composite.

(3) A process wherein the reaction product obtained in the process (2) is allowed to react further with a titanium compound.

(4) A process wherein the reaction product obtained in the process (1) or (2) is allowed to react further with an electron donor ($a_0$) and a titanium compound.

(5) A process wherein a solid product obtained by pulverizing a magnesium compound, the above-mentioned compound having at least two ether linkages and a titanium compound is treated with any of halogen, a halogen containing compound and an aromatic hydrocarbon. This process may contain a step of pulverizing only the magnesium compound or the magnesium compound and the compound having at least two ether linkages, or the magnesium compound and the titanium compound in the presence of or in the abcence of a pulverizing assistant. The pulverized product may be pretreated with a reaction assistant, followed by treatment with halogen. The reaction assistant used herein includes organoaluminum compounds or halogen containing silicon compounds.

(6) A process wherein the solid product obtained in the processes (1) to (4), respectively, is treated with halogen, a halogen compound or an aromatic hydrocarbon.

(7) A process wherein a catalytic reaction product resulting from the reaction of a metallic oxide with an organomagnesium compound and a halogen containing compound is brought into contact with the above-mentioned compound having at least two, ether linkages and a titanium compound.

(8) A process wherein a magnesium compound such as magnesium salt of an organic acid, alkoxymagnesium or aryloxymagnesium is brought into contact with the above-mentioned compound having at least two ether linkages, and at least one compound sellected from among a titanium compound and a halogen containing hydrocarbon.

(9) A process wherein a hydrocarbon solution containing at least a magnesium compound and alkoxytitanium, a titanium compound, the above-mentioned compound having at least two ether linkages and, if necessary, a halogen containing compound such as a halogen containing silicon compound are allowed to undergo reaction.

(10) A process wherein a magnesium compound in the liquid state having no reducing ability is allowed to react with an organoaluminum compound to deposit a solid magnesium aluminum composite, followed by reaction with the above-mentioned compound having at least two ether linkages and a titanium compound.

The amounts of the magnesium compound, titanium compound in the liquid state and electron donor ($a_0$) used in the preparation of the solid titanium component (A) by the above-illustrated processes vary depending upon the kind of each compound used, conditions, and contacting order. Generally, however, there are used, based on 1 mole of the magnesium compound, the electron donor ($a_0$) in an amount of 0.01–5 moles, preferably 0.1–1 mole, and the liquid titanium compound in an amount of 0.1–1000 moles, preferably 1–200 moles.

The temperature at which these compounds are brought into contact with one another is usually from −70° to 200° C., preferably −30–150° C.

The solid titanium component (A) thus obtained contains titanium, magnesium, halogen and electron donor ($a_0$).

In this solid titanium component (A), halogen/titanium (atomic ratio) is 2–100, preferably 4–90, electron donor ($a_0$)/titanium (molar ratio) is 0.01–100, preferably 0.2–10, and magnesium/titanium (atomic ratio) is 2–100, preferably 4–50.

The solid titanium catalyst component [I] for olefin polymerization of the present invention is formed by bringing the above-mentioned solid titanium component (A) into contact with (B) an electron donor ($b_0$).

The electron donor ($b_0$) used herein includes, in addition to the above-mentioned electron donor ($a_0$), that is, the compound having at least two ether linkages and the electron donor ($a_1$), an electron donor ($b_1$) including an organosilicon compound, a nitrogen containing compound, an oxygen containing compound and a phosphorus containing compound. Of these compound, preferred are the compound having at least two ether linkages and the organosilicon compound. The organosilicon compound used as the electron donor ($b_1$) includes those represented by the following general formula.

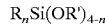

$$R_n Si(OR')_{4-n}$$

wherein R and R' are each a hydrocarbon radical, and 0<n<4.

The organosilicon compound represented by the above-mentioned general formula includes concretely trimethylmethoxysilane, trimetylethoxysilane, dimetyldimethoxysilane, dimethyldiethoxysilane, di-iso-propyldimethyoxysilane, t-butylmethyldimethoxysilane , t-butylethyldimethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis(ethylphenyl)dimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltri-iso-propoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, dimethyltetraethoxydisiloxane, cyclopentyltrimethoxysilane, 2-methylcyclopentyltrimethoxysilane, 2,3-dimethylcyclopentyltriethoxysilane, cyclopentyltrimethoxysilane, dicyclopentyldimethoxysilane, bis(2-methylcyclopentyl) dimethoxysilane, bis(2,3-dimethylcyclopentyl) dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane, cyclopentyldimethylethoxysilane. Of these compounds exemplified above, preferred are ethyltriethoxysilane, n-propyltriethoxysilane, t-butyltriethoxysilane, vinyl triethoxysilane, phenyl triethoxysilane, vinyl tribytoxysilane, diphenyldimethoxysilane, phenylmethyldimethoxysilane, bis-p-tolyldimethoxysilane, p-tolylmethyldimethoxysilane, dicyclohexylmethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane. These organosilicon compounds may also be used in admixture of two or more.

As mentioned above, in addition to the organosilicon compound as exemplified above, there may be used as the electron donor ($b_1$) a nitrogen containing compound, an oxygen containing compound and a phosphorus containing compound.

The nitrogen containing compound mentioned above includes concretely 2,6-substituted piperidines such as those having the following structural formulas

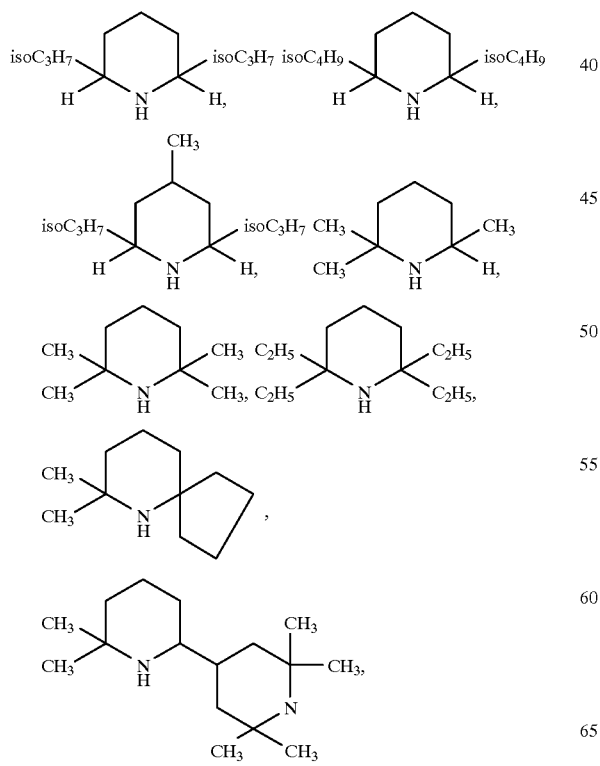

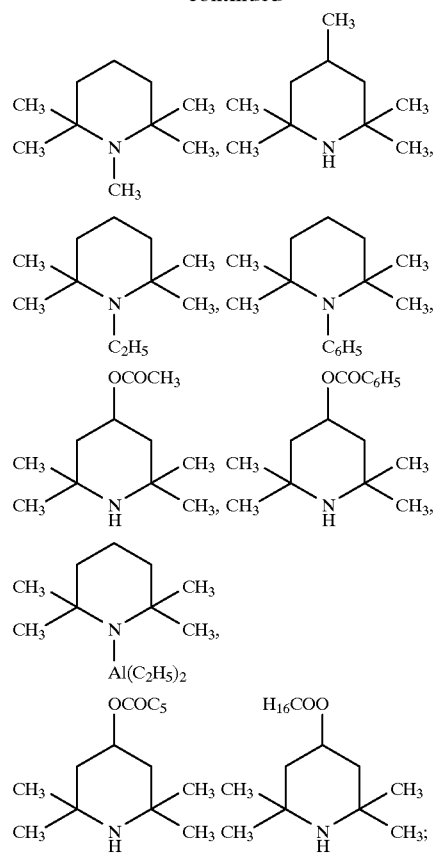

2.5-substituted piperidines such as those having the following structural formula

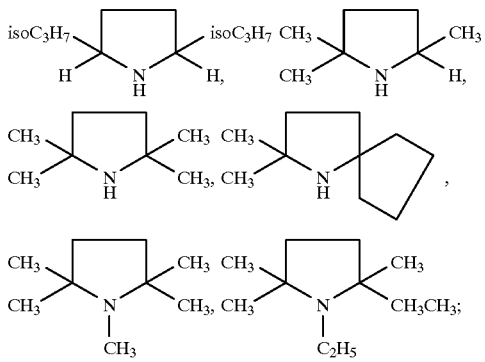

substituted methylenediamines such as N,N,N',N'-tetramethylmethylenediamine and N,N,N',N'-tetraethylmethylenediamine; and substituted imidazolidine such as 1,3-dibenzylimidazolidine and 1,3-dibenzyl-2-phenylimidazolidine.

The phosphorus containing compound used herein includes concretely phosphorous acid esters such as triethyl phosphite, tri-n-propyl phosphite, triisopropyl phosphite, tri-n-butyl phosphite, triisobutyl phosphite, diethyl-n-butyl phosphite and diethylphenyl phosphite.

The oxygen containing compound used herein includes 2,6-substituted tetrahydropyranes such as those having the following structural formulas

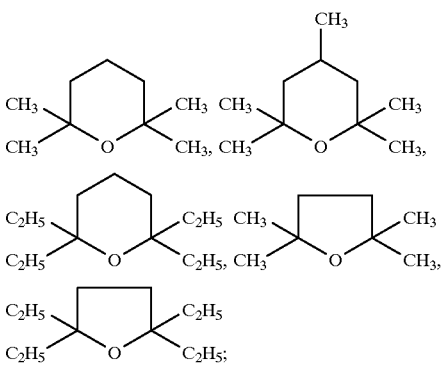

and 2,5-substituted tetrahydropyranes such as having the following formula.

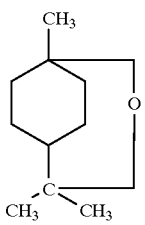

These compounds may be used either singly or admixture.

When the solid titanium catalyst component [I] is obtained by the contact of the solid titanium component (A) with the electron donor ($b_0$), the amount of the electron donor ($b_0$) used is 0.1–50 moles, preferably 0.5–30 moles and especially 1–10 moles based on 1 mole of titanium atom of the solid titanium component (A). In that case, if necessary, an organometallic compound [IIa] as will be mentioned later may be used in an amount of 0.1–300 moles, preferably 0.5–100 moles and especially 1–50 moles based on 1 mole of titanium atom of the solid titanium component (A).

In the solid titanium catalyst component [I], as illustrated above, the electron donor ($a_0$) and ($b_0$) used in the preparation of the solid titanium component (A) may be electron donors other than the above-mentioned compounds having at least two ether linkages, and at least one of the electron donors ($a_0$) and ($b_0$) used in the solid titanium component (A) must contain the compound having at least two ether linkages.

The second olefin polymerization catalyst of the present invention contains a solid titanium catalyst component [Ia] containing titanium, magnesium, halogen and a compound having at least two ether linkages with a plurality of intermediately existing bonding atoms, and the third olefin polymerization catalyst of the invention contains a solid titanium catalyst component [Ib] containing titanium, magnesium, halogen and the electron donor ($a_1$).

The solid titanium catalyst component [Ia] or [Ib] may be prepared by the contact of the magnesium compound, a titanium compound, the above-mentioned compound having at least two ether linkages or the electron donor ($a_1$) with one another, and said compounds are used in the preparation of the above-mentioned solid titanium component (A). In the case of the solid titanium catalyst component [Ia], however, the electron donor ($a_1$) may be used together with the compound having at least two ether linkages.

Furthermore, the solid titanium catalyst component [Ia] or [Ib] may also be prepared by the manner as mentioned above while using also the same organic and inorganic compounds as the carrier compounds or reaction assistants as used in the case of the preparation of the above-mentioned solid titanium component (A).

The above-mentioned electron donor ($a_1$) is not always used as a starting material, and can also be formed in the course of the preparation of the solid catalyst component [Ia] or [Ib].

The solid titanium catalyst component [Ia] is prepared, as illustrated above, by bringing the above-mentioned magnesium compound, liquid titanium compound, compound having at least two ether linkages and, if necessary, carrier compound and electron donor ($a_1$) into contact with one another.

Briefly set below, by way of illustration but not limitation, are several examples of the process for the preparation of the solid titanium catalyst component [Ia] using the above-mentioned compounds.

(1) A process wherein the magnesium compound, compound having at least two ether linkages and titanium compound are brought into contact with one another in any order and allowed to undergo reaction. In carrying out this reaction, each reactant may be pretreated with the compound having at least two ether linkages and/or the electron donor ($a_1$) or with a reaction assistant such as an organoaluminum compound or a halogen containing silicon compound.

(2) A process wherein a magnesium compound in the liquid state having no reducing ability is allowed to react with a titanium compound in the liquid state, thereby depositing a solid magnesium titanium composite.

(3) A process wherein the reaction product obtained in the process (2) is allowed to react further with the titanium compound.

(4) A process wherein the reaction product obtained in the process (1) or (2) is allowed to react further with the electron donor ($a_1$) and the titanium compound.

(5) A process wherein a solid product obtained by pulverizing the magnesium compound, compound having at least two ether linkages and titanium compound is treated with any of halogen, a halogen containing compound and an aromatic hydrocarbon. In this process, there may also be involved a step of pulverizing only the magnesium compound, or the magnesium compound hand the compound having at least two ether linkages, or the magnesium compound and the titanium compound in the presence of or in the absence of a pulverizing assistant. After pulverization, the solid product obtained may be pretreated with the reaction assistant, followed by treatment with halogen or the like. The reaction assistant used includes an organoaluminum compound or a halogen containing silicon compound.

(6) A process wherein the product obtained in any of the processes (1) to (4) is treated with halogen, a halogen containing compound or an aromatic hydrocarbon.

(7) A process wherein a catalytic reaction product of a metallic oxide, an organomagnesium compound and a halogen containing compound is brought into contact with the compound having at least two ether linkages and the titanium compound.

(8) A process wherein a magnesium compound such as magnesium salt of an organic acid, alkoxymagnesium or allyloxymagnesium is brought into contact with the compound having at least two ether linkages,and at least one compound sellected from among the titanium compound and a halogen containing hydrocarbon.

(9) A process wherein a hydrocarbon solution containing at least the magnesium compound and alkoxytitanium, the titanium compound, the compound having at least two ether linkages and, if necessary, a halogen containing compound such as a halogen containing silicon compound are allowed to undergo reaction.

(10) A process wherein a magnesium compound in the liquid state having no reducing ability is allowed to react with an organoaluminum compound, thereby depositing a solid magnesium aluminum composite, followed by reaction with the compound having at least two ether linkages and the titanium compound.

When the solid titanium catalyst component [Ia] is prepared by the processes as illustrated above, the amounts of the magnesium compound, liquid titanium compound and compound having at least two ether linkages vary depending upon the kind of the compounds used, contact conditions and contacting order employed. Generally, however, there may be used, based on 1 mole of magnesium atom of the magnesium compound, the compound having at least two ether linkages in an amount of 0.01–5 moles, preferably 0.1–1 mole, and the titanium compound in the liquid state in an amount of 0.1–1000 moles, preferably 1–200 moles.

The temperature at which these compounds are brought into contact with one another is usually from −70° C. to 200° C., preferably 10–150° C.

The solid titanium catalyst component [Ia] contains titanium, magnesium, halogen and the above-mentioned compound having at least two ether linkages.

In this solid titanium catalyst component [Ia], halogen/titanium (atomic ratio) is 2–100, preferably 4–90, the compound having at least two ether linkages/titanium (molar ratio) is 0.01–100, preferably 0.2–10, and magnesium/titanium (atomic ratio) is 2–100, preferably 4–50.

The solid titanium catalyst component [Ib] used in the present invention may be prepared by bringing the magnesium compound, titanium compound in the liquid state, electron donor ($a_1$) and, if necessary, the carrier compound or the like into contact with one another.

Briefly set forth below, by way of illustration but not limitation, are several examples of the process for the preparation of the solid titanium catalyst component [Ib].

(1) A process wherein the magnesium compound, electron donor ($a_1$) and titanium compound are brought into contact with one another and allowed to undergo reaction. In carrying out this reaction, each compound may be pretreated with the electron donor ($a_1$) and/or a reaction assistant such as an organoaluminum compound or a halogen containing silicon compound. In this process, the electron donor ($a_1$) is used at least one time.

(2) A process wherein a magnesium compound in the liquid state having no reducing ability is allowed to react with the titanium compound in the liquid state in the presence of the electron donor ($a_1$), thereby depositing a solid magnesium titanium composite.

(3) A process wherein the reaction product obtained in the process (2) is allowed to react further with the titanium compound.

(4) A process wherein the reaction product obtained in the process (1) or (2) is allowed to react further with the electron donor ($a_1$) and the titanium compound.

(5) A process wherein a solid product obtained by pulverizing the magnesium compound, electron donor ($a_1$) and titanium compound is treated any of halogen, a halogen compound and an aromatic hydrocarbon. In this process, there may be involved a step of pulverizing only the magnesium compound, a complex compound consisting of magnesium compound and electron donor, or the magnesium compound and the titanium compound. After pulverization, the solid product obtained may be treated with a reaction assistant, followed by treatment with halogen or the like. The reaction assistant used herein may include an organoaluminum compound or a halogen containing silicon compound.

(6) A process wherein the reaction product obtained in any of the processes of (1) to (4) is treated with halogen, a halogen compound or an aromatic hydrocarbon.

(7) A process wherein a catalytic reaction product of a metallic oxide, an organomagnesium and a halogen containing compound is brought into contact with the electron donor ($a_1$) and titanium compound.

(8) A process wherein a magnesium compound such as magnesium salt of an organic acid, alkoxymagnesium or aryloxymagnesium is allowed to react with the electron donor ($a_1$) and at least one compound sellected from among titanium compound and/or a halogen containing hydrocarbon.

(9) A process wherein a hydrocarbon solution containing at least the magnesium compound and alkoxytitanium, the titanium compound, the electron donor ($a_1$) and, if necessary, a halogen containing compound such as a halogen containing silicon compound are allowed to undergo reaction.

(10) A process wherein a magnesium compound in the liquid state having no reducing ability is allowed to react with an organoaluminum compound to deposit a solid magnesium aluminum composite, followed by reaction with the electron donor ($a_1$) and titanium compound.

In preparing the solid titanium catalyst component [Ib] by the above-mentioned processes, the amounts of the magnesium compound, the titanium compound in the liquid state and the electron donor ($a_1$) used vary depending on the kind of the compound used, contacting conditions and contacting order. Generally, however, there may be used, based on 1 mole of magnesium, the electron donor ($a_1$) in an amount of 0.01–5 moles, preferably 0.1–1 mole, and the titanium compound in the liquid state in an amount of 0.1–1000 moles, preferably 1–200 moles.

The temperature at which these compounds are brought into contact with one another is usually from −70 to 200° C., preferably 10–150° C.

The solid titanium catalyst component [Ib] contains titanium, magnesium, halogen and the electron donor ($a_1$).

In this solid titanium catalyst component [Ib], halogen/titanium (atomic ratio) is 1–100, preferably 4–90, electron donor ($a_1$)/titanium (molar ratio) is 0.01–100, preferably 0.2–10, and magnesium/titanium (atomic ratio) is 2–100, preferably 4–50.

The first prepolymerized polyolefin-containing catalyst of the present invention is prepared by using an olefin polymerization catalyst containing a solid titanium catalyst component [Ia] containing titanium, magnesium, halogen and a compound having at least two ether linkages with a plurality of intermediately existing bonding atoms.

The second prepolymerized polyolefin-containing catalyst of the invention in prepared by using a solid titanium catalyst component [Ib] containing titanium, magnesium, halogen and an electron donor ($a_1$).

The solid titanium catalyst component [Ia] or [Ib] mentioned above may be prepared by the same process for the preparation of the solid titanium catalyst component as employed in the case of the second and third olefin polymerization catalyst of the invention, and the composition ratio thereof is the same as in the solid titanium catalyst component used in the second or third olefin polymerization catalyst of the invention.

In the present invention, the first to third olefin polymerization catalysts and the first and second prepolymerized polyolefin-containing catalysts are formed by using the above-illustrated solid titanium catalyst components [I], [Ia] and [Ib], the organometallic compound catalyst components [IIa] and [IIb], and the electron donor components [III] and [IIIa] in specific combination.

In the first to seventh olefin polymerization methods, there are used for polymerization of olefin catalysts or prepolymerized olefin cantaining catalysts formed by using the above-illustrated solid titanium catalyst components [I], [Ia] and [Ib], the organometallic compound catalyst components [IIa] and [IIb], and the electron donor components [III] and [IIIa] in specific combination.

For example, the first olefin polymerization catalyst of the invention may be formed from the solid titanium catalyst component [I], the organometallic compound catalyst component [IIa] containing a metal selected from those belonging to Groups I to III of the periodic table and, if necessary, the electron donor (c) [III] including the above-mentioned compound having at least two ether linkages.

FIG. 1 is given to illustrate the concrete example of the step for preparing the olefin polymerization catalyst of the invention.

The organometallic compound catalyst component [IIa] as used herein includes, for example, an organoaluminum compound, a complex alkylation product of a metal of Group I with aluminum, and an organometallic compound of a metal of Group II.

The organoaluminum compound mentioned above includes those represented by the formula $R^a_n AlX_{3-n}$ wherein $R^a$ is a hydrocarbon radical of 1–12 carbon atoms, X is halogen or hydrogen, and n is 1–3.

In the above formula, $R^a$ is a hydrocarbon radical of 1–12 carbon atoms, for example, alkyl, cycloalkyl or aryl, and concretely includes methyl, ethyl, n-propyl, isopropyl, isobutyl, pentyl, hexyl, octyl, cyclopentyl, cyclohexyl, phenyl or tolyl.

The organoaluminum compound illustrated above includes concretely such compounds as exemplified below.

trialkyl alminiums such as trimethylalminium, tri-isobutylalminium, trioctylalminium, tri-ethylalminium, tri-isopropylalminium, tri-2-ethylhexylalminium;

alkenylalminium such as iso-prenylalminium;

dialkylalminium halides such as dimethylalminium chloride, diethylalminium chloride, di-iso-propylalminium chloride, di-iso-butylalminium chloride, dimethylalminium bromide;

alkylalminium sesquihalide such as methylalminium sesquichloride, ethylalminiumsesquichloride, iso-propylalminium sesquichloride, butylalminium sesquichloride, ethylalminium sesquibromide;

alkylalminium dihalides such as methylalminium dichloride, ethylalminium dichloride, iso-propylalminium dichloride, ethylalminium dibromide;

alkylalminium hydrides such as diethylalminium hydride, di-iso-butylalminium hydride:

As the organoaluminum compound, there may also be used such compounds as may be represented by the formula $R^a_n AlY_{3-n}$ wherein $R^a$ is as defined above, Y is $-OR^b$, $-OSiR^c_3$, $-OAlR^d_2$, $-NR^e_2$, $SiR^f_3$ or

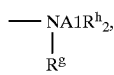

n is 1–2, $R^b$, $R^c$, $R^d$ and $R^h$ are each methyl, ethyl, isopropyl, isobutyl, cyclohexyl, or phenyl, $R^e$ is hydrogen, methyl, ethyl, isopropyl, phenyl or trimethylsilyl, and $R^f$ and $R^g$ are each methyl or ethyl.

Concretely, such organoaluminum compounds as illustrated above include those having the following formulas.

(i) Compounds of the formula $R^a_n Al(OR^b)_{3-n}$ such as dimethylaluminum methoxide, diethylaluminum ethoxide and diisobutylaluminum methoxide, (ii) compounds of the formula $R^a_n Al(OSiR^c_3)_{3-n}$ such as $Et_2Al(OSiMe_3)$, $(iso-Bu)_2Al(OSiMe_3)$ and $(iso-Bu)_2Al(OSiEt_3)$, (iii) compounds of the formula $R^a_n Al(OAR^d_2)_{3-n}$ such as $Et_2AlOAlEt_2$, and $(iso-Bu)_2AlOAl(iso-Bu)_2$, (iv) compounds of the formula $R^a_n Al(NR^e_2)_{3-n}$ such as $Me_2AlNEt_2$, $Et_2AlNHMe$, $Me_2AlNHEt$, $Et_2AlN(Me_3Si)_2$ and $(iso-Bu)_2AlN(Me_3Si)_2$, (v) compounds of the formula $R^a_n Al(SiR^f_3)_{3-n}$ such as $(iso-Bu)_2AlSiMe_3$, and Rg (vi) Compounds of the formula

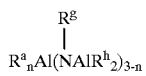

such as

and

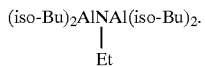

Preferred examples of the above-exemplified organoaluminum compounds are those represented by the formula $R^a_3Al$, $R^a_nAl(OR^b)_{3-n}$ and $R^a_nAl(OAlR^d_2)_{3-n}$.

The complex alkylation product of a metal of Group I with aluminum is exemplified by a compound represented by the general formula

wherein $M^1$ is Li, Na or K, and $R^j$ is a hydrocarbon radical of 1–15 carbon atoms, and includes concretely $LiAl(C_2H_5)_4$ and $LiAl(C_7H_{15})_4$.

The organometallic compound containing a metal of Group II is exemplified by a compound represented by the general formula $R^1R^kM_2$ wherein $R^k$ and $R^1$ are each a hydrocarbon radical of 1–15 atoms or halogen, provided that both $R^k$ and $R^1$ do not represent halogen, though may be the same or different, $M_2$ is Mg, Zn or Cd, and includes concretely diethylzinc, diethylmagnesium, butylethylmagnesium, ethylmagnesium chloride and butylmagnesium chloride. These compounds may be used in admixture of two or more.

In preparing the first olefin polymerization catalyst of the invention, if necessary, there may be used the electron donor (c) [III] including a compound having at least two ether linkages with a plurality of intermediately existing bonding atoms. In this case, however, besides the compound having at least two ether linkages, there may also be used, for example, the electron donors $(a_1)$ and $(b_1)$ used in the preparation of the solid titanium catalyst component [I] of the invention.

The second olefin polymerization catalyst of the invention, which is used in the second polymerization method, contains the above-mentioned solid titanium catalyst component [Ia] along with as the organometallic compound catalyst component the organoaluminum compound catalyst component [IIb] comprising a halogen containing organoaluminum compound and an organoaluminum compound containing no halogen.

Figure 2:
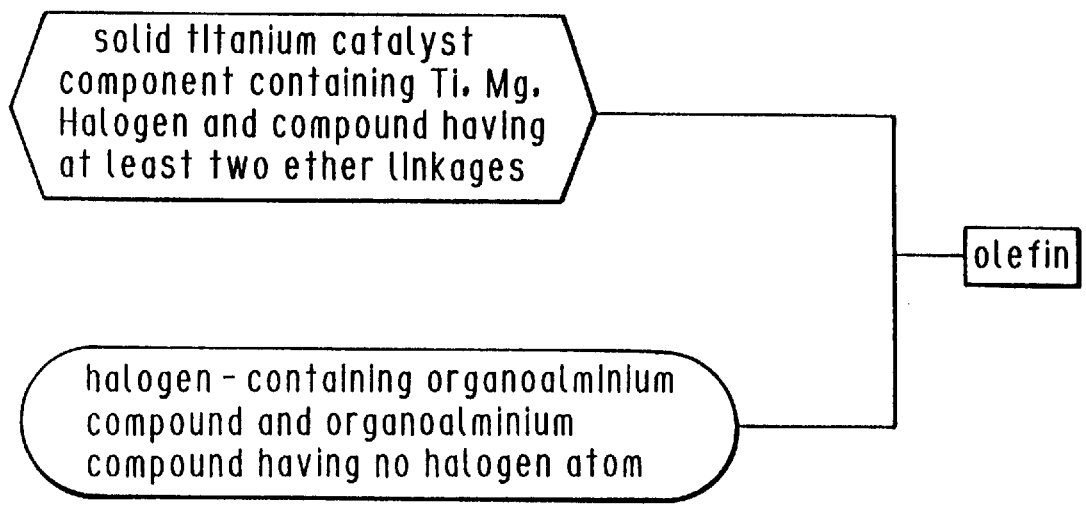

FIG. 2 is given to illustrate a concrete example of a step for preparing the second olefin polymerization catalyst of the invention.

As the organoaluminum compound containing no halogen, there may be mentioned the organoaluminum compound represented by the aforementioned formula $R^a_n AlX_{3-n}$ in which n=3, for example, trialkylaluminum and alkenylaluminum.

Further, the organoaluminum compound containing no halogen may be exemplified by the compound represented by the aforementioned formula $R^a_n AlY_{3-n}$.

As the halogen containing organoaluminum compound, there may be mentioned the organoaluminum compound represented by the aforementioned formula $R^a_n AlX_{3-n}$ in which 1≦n<3, for example, dialkylaluminum halide, alkylaluminum sesquihalide and alkylaluminum dihalide.

The organoaluminum compound catalyst component [IIb] used in the invention may be prepared by using the organoaluminum compound containing no halogen in an amount, based on 1 mole of the halogen containing organoaluminum compound, of usually 0.01–19 moles, preferably 0.1–5 moles.

In the olefin polymerization catalyst of the invention, there may be used, if necessary, the electron donor (c), that is, any one of the above -me ntioned compound having at least two ether linkages, the electron donor ($a_1$) and electron donor ($b_1$) in addition to the above-mentioned organometallic compound catalyst compornent [IIb].

Of the compounds used in the above case, preferred are the compound having at least two ether linkages and the organosilicon compound ($R_n Si(OR')_{4-n}$) exemplified as the electon donor ($b_1$).

The third olefin polymerization catalyst of the invention, which is used in the third olefin polymerizaiton method, contains the above-mentioned solid titanium catalyst component [Ib], organoaluminum compound catalyst component [IIb] and compound [IIIa] having at least two ether linkages with a plurality of intermediately existing bonding atoms.

Figure 3:
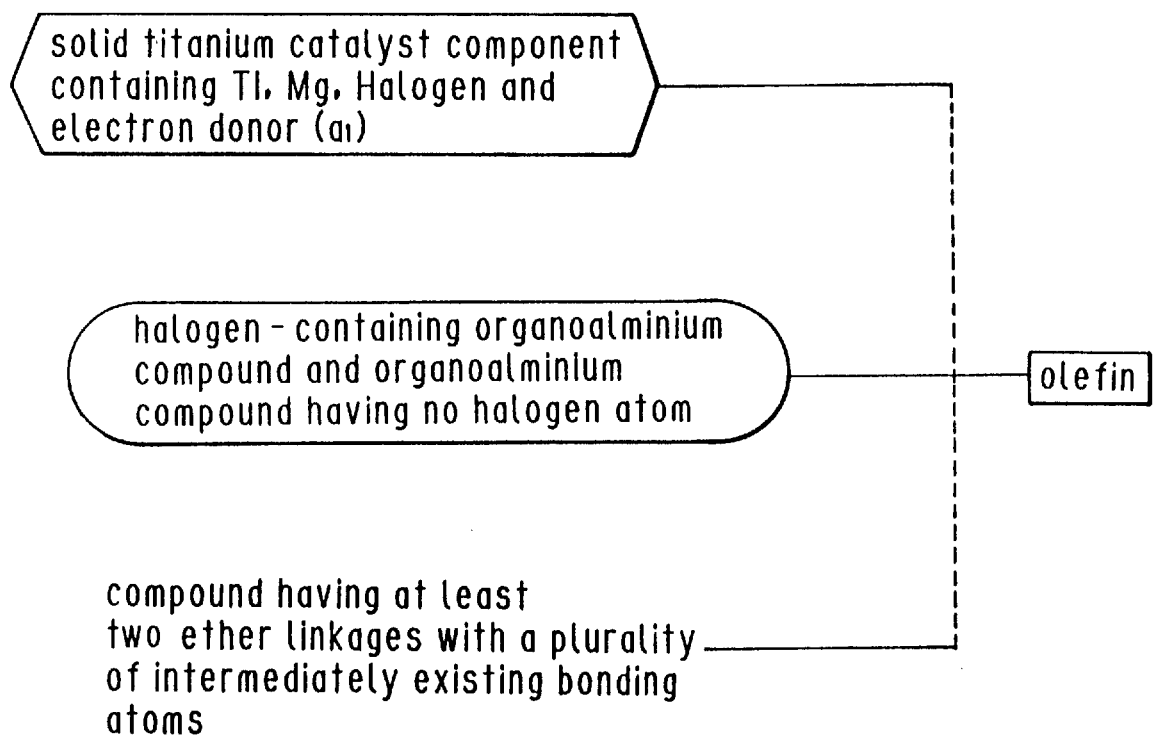

FIG. 3 is given to illustrate a concrete examlpe of a step for preparing the third olefin polymerization catalyst of the invention.

As the organoaluminum compound catalyst component [IIb], there may be used, for example, the same catalyst component comprising the halogen containing organoaluminum compound and the organoaluminum compound containing no halogen as used in the preparation of the second olefin polymerization catalyst of the invention.

The above-mentioned compound [IIIa] having at least two ether linkages used in the third olefin polymerization catalyst of the invention includes the same compound having at least two ether linkages as used in the preparation of the solid titanium catalyst component of the first olefin polymerization catalyst of the invention.

The third olefin polymerization catalyst of the invention may contain an electron donor in addition to the above-mentioned compound having at least two ether linkages, and such electron donor as used herein includes, for example, the electron donors ($a_1$) and ($b_1$) used in the preparation of the first olefin polymerization catalyst of the invention. Of the compounds used in the above case, prefffered are and the organo silicon compound ($R_n Si (OR')_{4-n}$) exemplified as the electron doner ($b_1$).

The first prepolymerized polyolefin-containing catalyst of the present invention, which is used in the fourth olefin polymerization method, is prepared by polymerizing olefin by using an olefin polymerization catalyst containing the solid titanium catalyst component [Ia] and the organometallic compound catalyst component [IIa] containing a metal selected from among those belonging to Groups I to III of the periodic table.

The solid titanium catalyst component [Ia] mentioned above is the same component [Ia] as used in the second olefin polymerization catalyst of the invention.

The organometallic compound catalyst component [IIa] mentioned above is the same component [IIa] as used in the first olefin polymerization catalyst of the invention.

In the first prepolymerized polyolefin-containing catalyst of the invention, there may be used, if necessary, the electron donor (c), that is, the compound having at least two ether linkages, the electron donor ($a_1$) and the electron donor ($b_1$) together with the above-mentioned organometallic compound catalyst component [IIa].

Of the compounds used herein, particularly preferred are the compound having at least two ether linkages and an organosilicon component exemplified as the electron donor ($b_1$).

The second prepolymerized polyolefin-containing catalyst. of the invention, which is used in the fifth olefin polymerization method, contains an olefin polymerization catalyst containing the above-mentioned solid titanium catalyst component [Ib], the organometallic compound catalyst. component [IIa] and the compound [IIIa] having at least two ether linkages with a plurality of intermediately existing bonding atoms.

As the organometallic compound catalyst component [IIa] as used in the above-mentioned olefin polymerization catalyst, there may be mentioned, for example, the same catalyst component containing the organometallic compound as used in the preparation of the first olefin polymerization catalyst of the invention.

As the compound [IIIa] as used in the above-mentioned olefin polymerization catalyst, there may be mentioned the same compound having at least two ether linkages as used in the preparation of the first olefin polymerization catalyst of the invention.

The second prepolymerized polyolefin-containing catalyst of the invention may contain an electron donor in addition to the above-mentioned compound having at least two ether linkages, for example, the electron donors ($a_1$) and ($b_1$) used in the preparation of the first olefin polymerization catalyst of the invention.

The first prepolymerized polyolefin-containing catalyst [Ia-IIa-IIIa] of the invention may be formed by polymerizing α-olefin on an olefin polymerization catalyst containing the above-mentioned solid titanium catalyst component [Ia] and organometallic compound catalyst component [IIa].

The second prepolymerized polyolefin-containing catalyst. [Ib-IIa-IIIa] of the invention may be formed by polymerizing α-olefin on an olefin polymerization catalyst containing the above-mentioned solid titanium catalyst component [Ib], organometallic compound catalyst component [IIa] and the compound [IIIa] having at least two ether linkages.

The first to third olefin polymerization catalysts of the invention may be prepolymerized when used in olefin polymerization.

The prepolymerization of the olefin polymerization catalyst may be carried out by prepolymerizing α-olefin in an amount, based on 1 g of the catalyst, of 0.1–1000 g, preferably 0.3–500 g and especially 1–200 g on said catalyst.

In carrying out this prepolymerization, the catalyst may be used in a concentration higher than that of the catalyst used in the system of the main polymerization.

The solid titanium catalyst component [I],[Ia] or [Ib] is used in the prepolymerization in an amount, per liter of a liquid medium, of usually 0.001–100 mmoles, preferably 0.01–50 mmoles, and especially 0.1–20 mmoles in terms of titanium atom.

The organometallic compound catalyst component [IIa] or [IIb] may be used in the prepolymerization in such an amount that the prepolymer is formed in an amount, based on 1 g of the solid titanium catalyst component [I], [Ia] or [Ib], of 0.1–1000 g, preferably 0.3–500 g, said amount being usually about 0.1–300 moles, preferably about 0.5–100 moles and especially 1–50 moles based on 1 mole of titanium atom in the solid titanium catalyst component [I], [Ia] or [Ib].

The electron donor [III] or [IIIa] may be used in the polymerization in an amount, based on 1 mole of titanium atom in the solid titanium catalyst component [I], [Ia] or [Ib], of 0.1–50 moles, preferably 0.5–30 moles and especially 1–10 moles.

The prepolymerization may be carried out using a mixture of an inert hydrocarbon solvent, α-olefin and the above-mentioned catalyst components under mild conditions.

The inert hydrocarbon solvent used herein includes concretely aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; and halogenated hydrocarbons such as ethylene chloride and chlorobenzene, or mixtures thereof. Of these inert hydrocarbon solvents exemplified above, particularly preferred are aliphatic hydrocarbons. When the prepolymerization is carried out using the inert hydrocarbon media as aforesaid, it is preferably carried out batchwise. On the one hand, the prepolymerization may also be carried out using α-olefin itself as a solvent or in a state where substantially no solvent is present. In that case, the prepolymerization is preferably carried out continuously.

The α-olefin used in the prepolymerization may be the same as or different from that used in the main polymerization as will be mentioned later, but in practice propylene is preferred.

The reaction temperature at which the prepolymerization is carried out is usually from about −20 to +100° C., preferably from about −20 to +80° C. and especially from 0 to +40° C.

In carrying out the prepolymerization, a molecular weight modifier such as hydrogen may be used. It is desirable to use in this case the molecular weight modifier in such an amount that an intrinsic viscosity [η], as measured in decalin at 135° C., of the polymer resulting from the prepolymerization is more than about 0.2 dl/g, preferably about 0.5–10 dl/g.

The prepolymerization as illustrated above is desirably carried out in such a manner that the polymer resulting therefrom amounts to about 0.1–1000 g, preferably about 0.3–500 g and especially 1–200 g based on 1 g of the solid titanium catalyst component [I], [Ia] or [Ib].

The first to third methods of olefin polymerization of the present invention comprise polymerizing olefin using the first to third olefin polymerization catalysts of the invention. As stated above, the olefin polymerization catalysts used herein may be prepolymerized.

The fourth or fifth method of olefin polymerization of the invention comprises polymerizing olefin using a catalyst containing the first or second prepolymerized polyolefin-containing catalyst, that is, the fourth or fifth olefin polymerization catalyst of the invention as will be mentioned later.

The fourth olefin polymerization catalyst of the invention contains the above-mentioned prepolymerized polyolefin-containing catalyst [Ia-IIa], the organoinetallic compound [IIa] containing a metal selected from among those belonging to Groups I to III and, if necessary, the electron donor [IIIb], that is, at least one compound selected from among the compound having at least two ether linkages with a plurality of intermediately existing bonding atoms, the electron donors ($a_1$) and ($b_1$).

The fifth olefin polymerization catalyst of the invention contains the above-mentioned prepolymerized polyolefin-containing catalyst [Ib-IIa-IIIa], the organometallic compound [IIa] containing a metal selected from among those belonging to Groups I to III of the periodic table and, if necessary, the electron donor [IIIb], that is, at least one compound selected from among the compound having at least two ether linkages with a plurality of intermediately existing bonding atoms, the electron donors ($a_1$) and ($b_1$).

The organometallic compound catalyst component [IIa] used in the above-mentioned olefin polymerization catalysts is the same as that used in the preparation of the above-mentioned prepolymerized polyolefin-containing catalyst.

The compound having at least two ether linkages mentioned above, and the electron donors ($a_1$) and ($b_1$) used therein are also the same as those used in the preparation of the above-mentioned prepolymerized polyolefin-containing catalyst.

Figure 4:
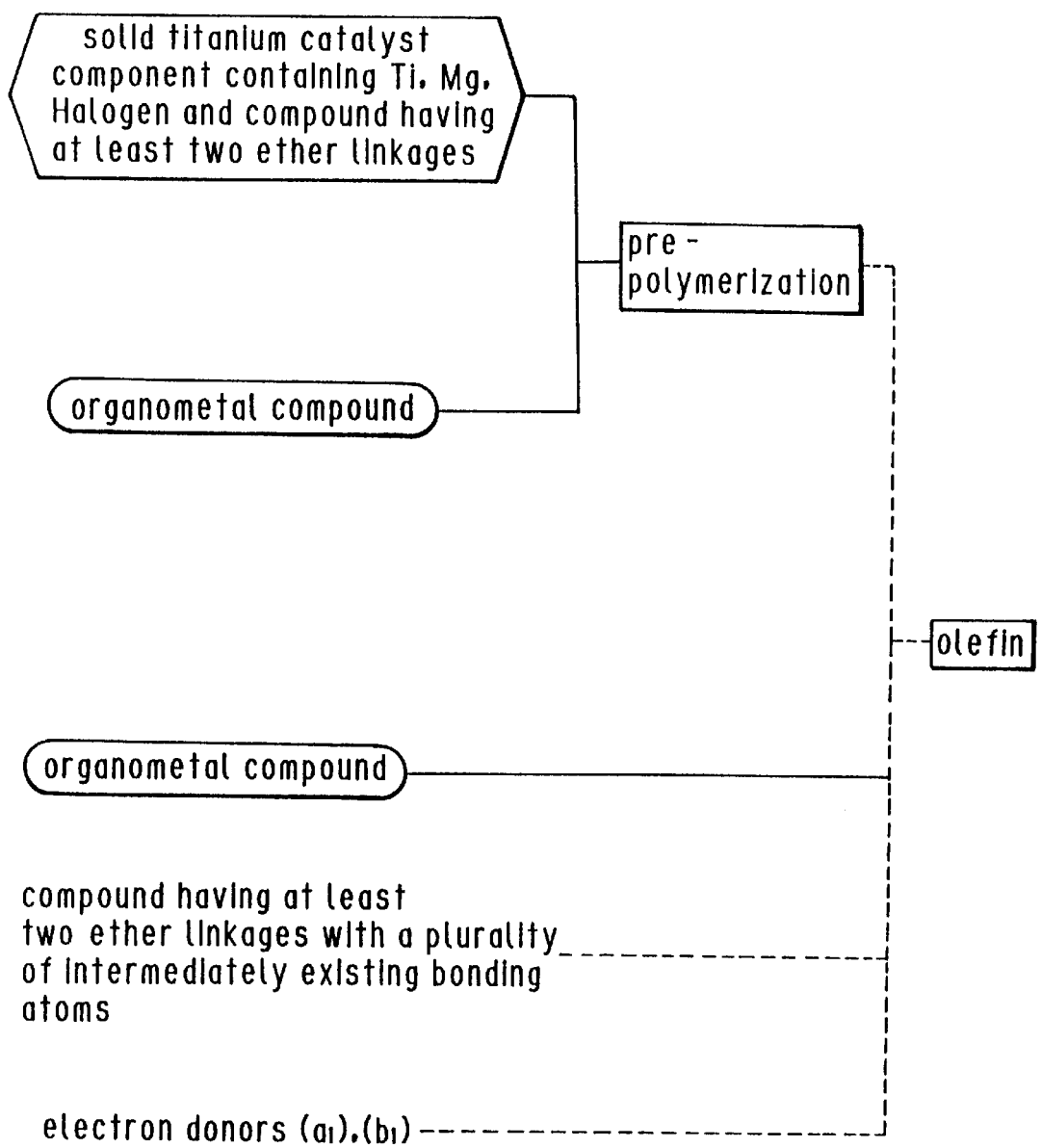
Figure 5:
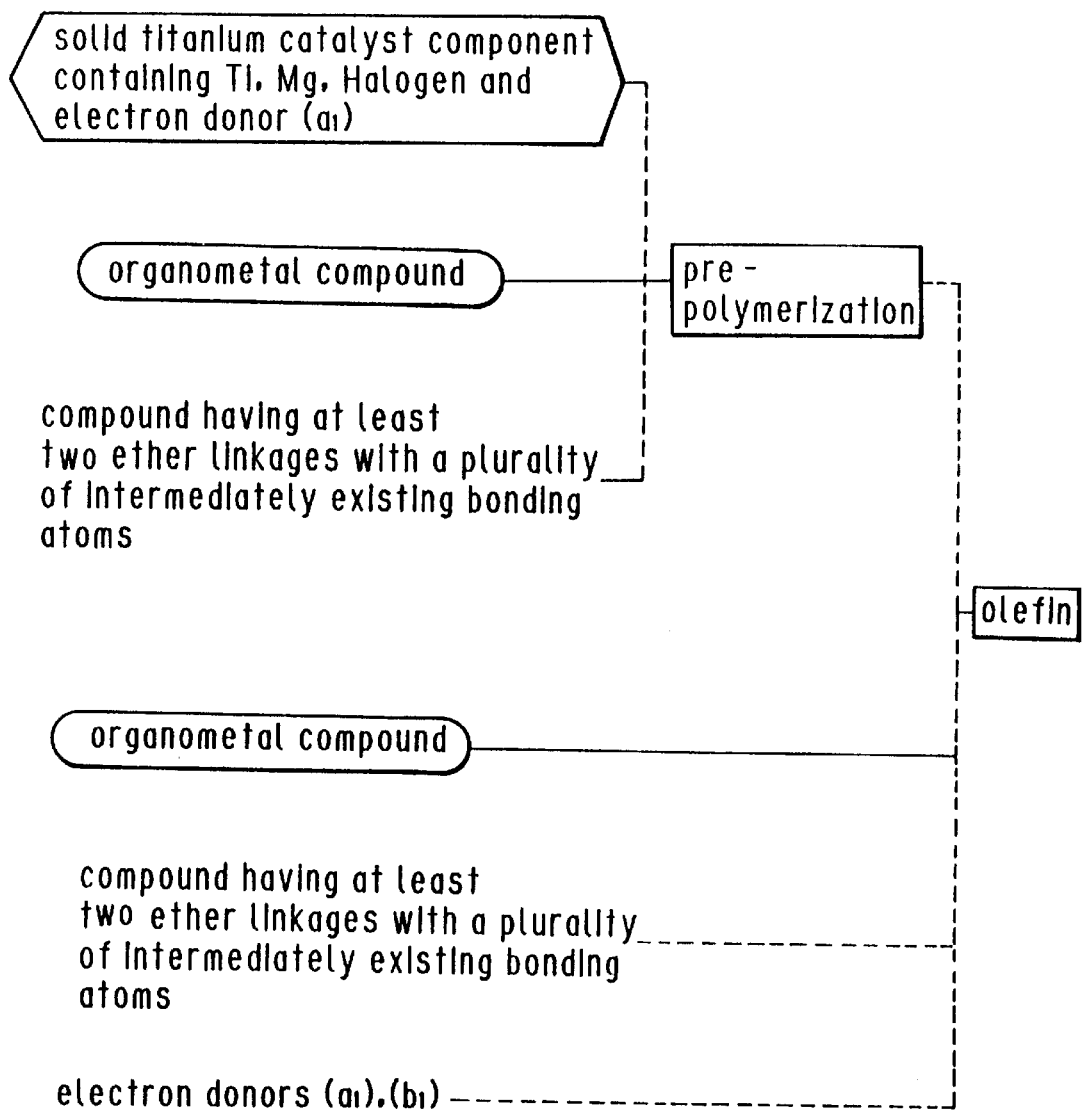

FIGS. 4 and 5 are given to illustrate concrete examples of the steps for preparing the fourth and fifth olefin polymerization catalysts of the invention.

In the sixth method for olefin polymerization of the present invention, at least one α-olefin is polymerized by using a catalyst containing the solid titanium catalyst component [Ia] and the organometallic compound [IIa] to obtain a specific polymer or copolymer.

In the seventh method for olefin polymerization of the present invention, at least one α-olefin is polymerized by using a catalyst containing the solid titanium catalyst component [Ib], the organometallic compound [IIa] and the compound having at least two ether linkages [IIIa] to obtain a specific polymer or copolymer.

Figure 6:
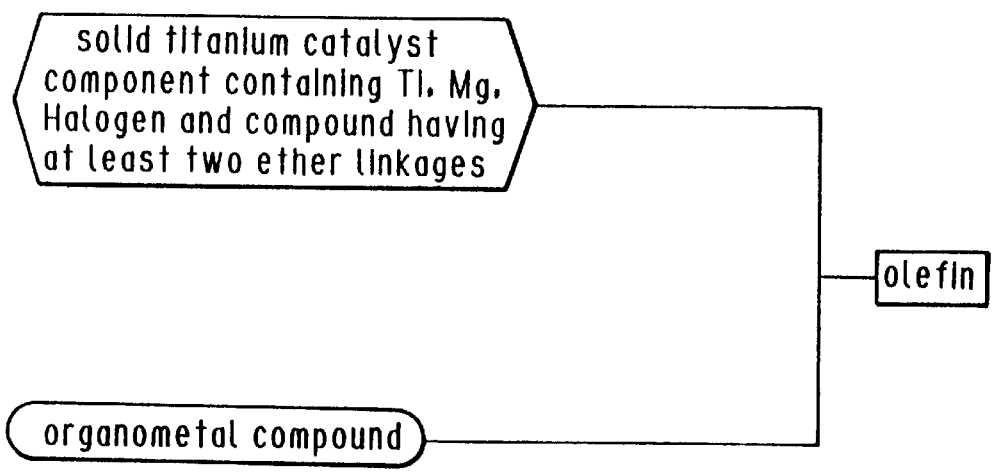
FIGS. 6 and 7 are given to illustrate concrete examples of the processes for the preparation of olefin polymerization catalysts used in the sixth or seventh olefin polymerizaiton method.
Figure 7:
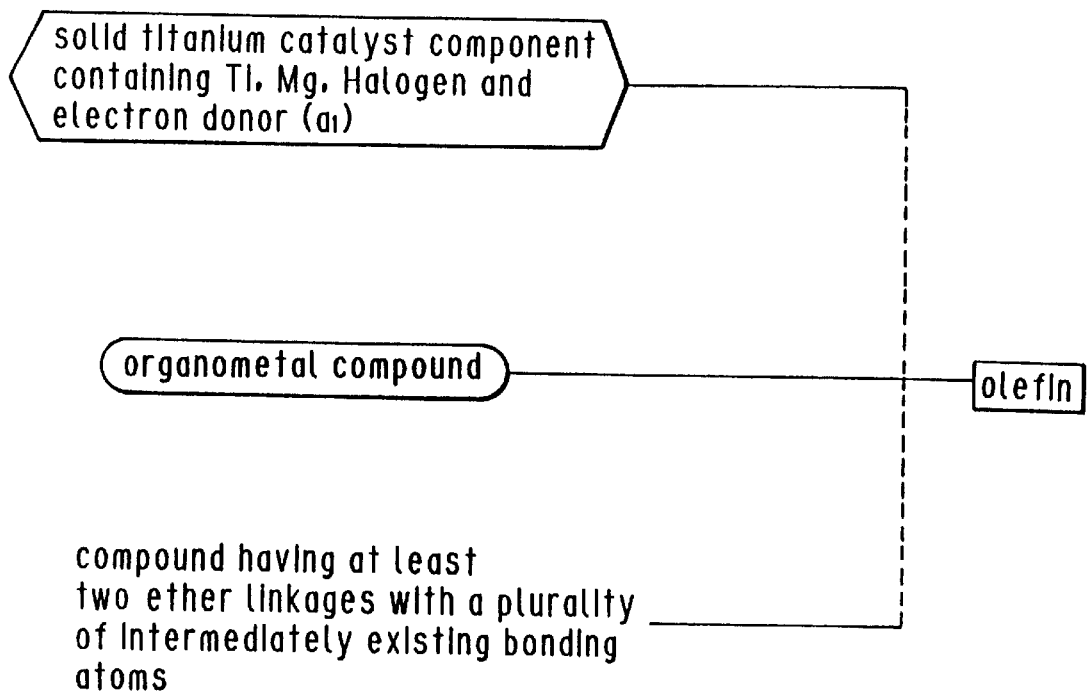

FIGS. 6 and 7 are given to illastrate concrete examples of the steps for preparing the catalysts used in the sixth and seventh method for polymerization of α-olefin.

In the sixth and seventh olefin polymerization methods, at least one α-olefin sellected from among α-olefins having at least 2 carbon atoms is polymerized to obtain a polymer or copolymer containing at least 70% of α-olefin having at least 4 carbon atoms by using the polymerization catalyst containing the solid titanium catalyst component [Ia] and the organometallic compound [IIa], the polymerization catalyst containing the solid titanium catalyst component [Ib], the organometallic compound [IIa] and the compound having at least two ether linkages [IIIa], or the first or second prepolymerized polyolefin-containing catalyst. The above polymerization catalysts are the catalysts used for preparing the first or second prepolymerized polyolefin-containing catalyst.

The first to seventh methods of olefin polymerization of the invention are illustrated below in detail.

Useful olefins in the first to fifth methods of olefin polymerization include ethylene and α-olefins of 3–20 carbon atoms, for example, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosane. In the sixth and seventh olefin polymerization methods of the present invention, of these alpha-olefins are sellected the α-olefin having at least 2 carbon atoms so as to make the α-olefin having at least 4 carbon atoms be the main comporment. In the sixth and seventh method of the present invention, at least one α-olefin having at least 4 carbon atoms sellected from the α-olefin having at least 2 carbon atoms are used in such an amount that the polymer or copolymer obtained are containing at least 70 mol % of the α-olefin having at least 4 carbon atoms. Further, in the present methods, as the starting materials for polymerization, there may also be used aromatic vinyl compounds such as styrene and allyl benzene; alicyclic vinyl compounds such as vinyl cyclohexane; cycloolefins such as cyclopentene, cycloheptene, norbornene, 5-methyl-2-norbornene, tetracyclodecene and 2-methyl-1,4,5,8-dimethano-1,2,3,4,4a,5,8,8a-octahydronaphthalene; and compounds having poly-unsaturation bonds such as conjugated diene or non-conjugated diene, for example, 6-methyl-1,6-octadiene, 7-methyl-1,6-octadiene, 6-ethyl-1, 6-octadiene, 6-propyl-1,6-octadiene, 6-butyl-1,6-octadiene, 6-methyl-1,6-nonadiene, 7-methyl-1, 6-nonadiene, 6-ethyl-1, 6-nonadiene, 7-ethyl-1,6-nonadiene, 6-methyl-1,6-decadiene, 7-methyl-1,6-decadiene, 6-methyl-1,6-undecadiene, isoprene and butadiene.

In the present invention, the polymerization may be carried out by liquid phase polymerization technique such as solution polymerization or suspension polymerization, or by vapor phase polymerization technique.

When the polymerization is carried out by reaction of the slurry polymerization, the reaction solvent used may be either the above-mentioned inert hydrocarbon or an olefin which is liquid at the reaction temperature.

In the methods of olefin polymerization of the invention, the solid titanium catalyst component [I], [Ia] or [Ib] is used in an amount, based on 1 liter of the polymerization volume, of usually about 0.001–0.5 mmole, preferably about 0.005–0.1 mmole in terms of titanium atom. The organometallic compound catalyst component [IIa] or [IIb] is used in such an amount that the metallic atom thereof amounts usually to about 1–2000 moles, preferably about 5–500 moles per 1 mole of titanium atom of the prepolymerized polyolefin-containing catalyst present in the polymerization system.

In the third method of olefin polymerization of the invention, the above-mentioned compound having at least two ether linkages is used in such an amount that said compound amounts usually to about 0.001–10 moles, preferably 0.01–2 moles based on 1 mole of the metallic atom of the compound [IIa] or [IIb].

In the first, second and fourth to seventh methods, an electron donor, namely, the compound having at least two ether linkages and/or electron donoer ($a_1$), ($b_1$) may be used in the above-mentioned amount.

When hydrogen is used at the time of the main polymerization, the molecular weight of the polymer resulting therefrom can be modified, and polymers high in melt flow rate can be obtained.

In the present invention, the polymerization temperature, of olefin is usually about 20–200° C., preferably about 50–150° C., and the polymerization pressure is usually from ordinary pressure to 100 kg/cm$^2$, preferably about 2–50 kg/cm$^2$. The polymerization may also be carried out batchwise, semi-continuously or continuously, or may be carried out in two or more stages under varied reaction conditions.

The olefin polymer thus obtained may be a homopolymer, random copolymer or block copolymer.

When the polymerization of olefin particularly propylene is carried out using such olefin polymerization catalysts as mentioned above, the resulting propylene polymer will come to have an isotactic index (I I) shown by a boiling heptane extraction residue of more than 70%, preferably more than 85% and especially more than 95%. In this case, steric regularity of the resulting polymer can be easily controlled by adjusting the amount of the above-mentioned compound having at least two ether linkages or electron donor to a desired level.

The polymer obtained in the f irst to fifth olefin polymerization methods has an indication Mw/Mn of molecular weight distribution as measured by GPC (gel permeation chromatography) of usually not more than 5, said value being smaller than that of the polymer obtained by the prior art method.

The olefin polymerization catalyst of the invention may contain other useful components for olefin polymerization in addition to the components as mentioned above.

In the sixth or seventh olefin polymerization method, since α-olefin having at least 2 carbon atoms is polymerized in the presence of the specific catalyst so as to obtain a poymer or copolymer containing at least 70 mol % of α-olefin having at least 4 carbon atom, there can be obtain a polymer or copolymer has an intrinsic viscosity [η] of 0.01–100 dl/g, prefferably 0.1–50 dl/g.

The alpha-olefin type polymer thus obtained may be blended, if neccesary, with a heat stabilizer, a weathering stabilizer, a chemical destaticzer,an anti-blocking agent, a lubricant, a nucleating agent, a pigment, a dye and an organic or inorganic filler.

EFFECT OF THE INVENTION

According to the solid titanium catalyst components for olefin polymerization of the invention, it is possible, when used along with the above-mentioned compound having at least two ether linkages as an electron donor, to obtain olefin polymerization catalyst having high activities and capable of giving polymers high in stereospecificity, even when an electron donor is not used further at the time of polymerization of olefin.

According to the solid titanium catalyst components for olefin polymerization of the invention, moreover, it is possible to obtain olefin polymerization catalysts capable of giving polymers higher in steric regularity by using further the above-mentioned compound having at least two ether linkages or a specific electron donor at the time of polymerization of olefin.

According to the first method of olefin polymerization using the first olefin polymerization catalyst of the invention containing the solid titanium catalyst component [I] and organometallic compound catalyst component [IIa], it is possible to carry out the polymerization reaction with high catalytic activities, and obtain polymers high in stereospecificity.

By the first method of olefin polymerization using the first olefin polymerization catalyst of the invention containing the organometallic compound catalyst component [IIa] and the above-mentioned compound having at least two ether linkages or a specific electron donor in addition to the above-mentioned two components, it is possible to obtain polymers higher in steric regularity.

According to the second method of olefin polymerization using the second olefin polymerization catalyst the solid titanium catalyst component containing the above-mentioned compound having at least two ether linkages as an electron donor and the organoaluminum compound catalyst component [IIb], it is possible to carry out the polymerization reaction efficiently with high catalytic activities, and obtain polymers high in stereospecificity.

By the second method of olefin polymerization using the second olefin polymerization catalyst of the invention containing the above-mentioned compound having at least two ether linkages or a specific electron donor in addition to the above-mentioned two components, it is possible to obtain polymers higher in steric regularity.

According to the third method of olefin polymerization using the third olefin polymerization catalyst of the invention containing the solid titanium catalyst component [Ib], the organometallic compound catalyst component [IIb] and the above-mentioned compound [IIIa] having at least two ether linkages, it is possible to carry out the polymerization reaction efficiently with high catalytic activities, and obtain polymers high in stereospecificity.

According to the first prepolymerized polyolefin-containing catalyst of the invention, it is possible, when used the solid titanium catalyst component [Ib] containing the compound having at least two ether linkages [IIb] as an electron donor, to obtain olefin polymerization catalysts high in activities and capable of giving polymers high in stereospecificity, even when an electron donor is not used further at the time of olefin polymerization.

According to the fourth method of olefin polymerization using the fourth olefin polymerization catalyst of the invention containing the prepolymerized polyolefin catalyst [Ia–IIa] containing the compound having at least two ether linkages as an electron donor and the organoaluminum compound catalyst component [IIa], it is possible to carry out the polymerization reaction efficiently with high catalytic activities, and obtain polymers high in stereospecificity.

By the fourth method of olefin polymerization using the fourth olefin polymerization catalyst of the invention containing the above-mentioned compound having at least two ether linkages and/or specific electron donors $(a_1),(b_1)$ in addition to the above-mentioned two components, it is possible to obtain polymer higher in steric regularity.

According to the second prepolymerized polyolefin-containing catalyst of the invention containing the above-mentioned compound having at least two ether linkages as an electron donor, it is possible to obtain olefin polymerization catalyst high in activities and capable of giving polymers high in stereospecificity even when an electron donor is further used at the time of olefin polymerization.

According to the fifth method of olefin polymerization using the fifth olefin polymerization catalyst of the invention containing, in addition to two components, that is, the above-mentioned prepolymerized polyolefin-containing catalyst [Ib-IIa-IIIa] and the organometallic compound catalyst component [IIa], the above-mentioned compound having at least two ether linkage and/or electron donors $(a_1)$, $(b_1)$ [III], it is possible to carry out the polymerization reaction efficiently with high catalytic activities, and obtain polymers high in stereospecificity.

According to the sixth method of olefin polymerization, by virtue of the use of the olefin polymerization catalyst containing the above solid titanium catalyst component [Ia] and the above organometallic compound catalyst component [IIa], the polymerization reaction efficiently proceeds with high catalytic activity, giving polymers containing at least 70 mol % of α-olefin having at least 4 carbon atoms high in stereospecificity and crystallinity.

According to the seventh method of olefin polymerization, by virtue of the use of the olefin polymerization catalyst containing the above solid titanium catalyst component [Ib] and the above organometallic compound catalyst component [IIa] and the above compound having at least two ether linkages [IIIa], the polymerization reaction efficiently proceeds with high catalytic activity, giving polymers containing at least 70 mol % of α-olefin having at least 4 carbon atoms high in stereospecificity and crystallinity.

The present invention is illustrated below with reference to examples, but it should be construed that the invention is in no way limited to these examples.

EXAMPLE 1

(Preparation of solid titanium catalyst component [A])

A mixture of 95.2 g of anhydrous magnesium chloride, 442 ml of decane and 390.6 g of 2-ethylhexyl alcohol was reacted with heating at 130° C. for 2 hours to prepare a homogeneous solution. To this solution was added 21.3 g of phthalic anhydride, and the mixture was stirred at 130° C. for one hour to thereby dissolve phthalic anhydride in the homogeneous solution. The homogeneous solution thus obtained was cooled to room temperature, and 75 ml of the homogeneous solution was added dropwise to 200 ml of titanium tetrachloride kept at –20° C. over a period of one hour. After completion of the addition, the temperature of the mixed solution was elevated to 110° C. and over a period of 4 hours. When the temperature of the mixture reached 110° C., 5.22 g of di-iso-butyl phthalate was added thereto, and the mixture was held with stirring at that temperature for 2 hours. After completion of the 2-hour reaction, the resulting solid was collected by hot filtration and re-suspended in 275 ml of titanium tetrachloride, followed by reaction with heating at 110° C. for 2 hours. After completion of the reaction, the solid was collected by hot filtration and thoroughly washed with decane and hexane kept at 110° C. until no free titanium compound was detected in the washing liquid. The solid titanium catalyst component [A] prepared in the manner mentioned above was stored as a decane slurry. A part thereof was dried to examine the catalyst composition. It was found that the thus-obtained solid titanium catalyst component [A] contained 2.4% by weight of titanium, 60% by weight of chlorine, 20% by weight of magnesium and 13.0% by weight of di-iso-butyl phthalate.

(Pretreatment of solid titanium catalyst component [A])

Into a 400 ml four-necked glass reactor equipped with a stirrer, were introduced 100 ml of purified hexane, 10 mmol of triethylaluminum, 2 mmol of 2-isopropyl-2-isopentyl-1,3-dimethoxypropane (IPAMP) and one mmol, in terms of titanium atom, of the solid titanium catalyst component [A] obtained above in a nitrogen atmosphere, and the mixture was mixed with stirring at 20° C. for one hour and then left to stand, followed by the removal of the supernatant. The solid was washed two times by a washing treatment consisting of adding purified hexane to re-suspend the solid and leaving to stand followed by removal of the supernatant. The solid obtained was re-suspended in purified hexane and the whole amount of the resulting slurry was transferred to a catalyst bottle. In this transfer operation, the whole volume of the slurry was measured and at the same time, the concentration of the catalyst in the slurry was measured.

(Polymerization)

Into an autoclave having an internal volume of 2 litter was charged 750 ml of purified hexane. Into the autoclave were then introduced 0.75 mmol of triisobutylaluminum and 0.015 mmol, in terms of titanium atom, of the pretreated solid titanium catalyst component [A] in a propylene atmosphere at 40° C.

After the mixture was heated to 60° C., 200 ml of hydrogen was introduced, the temperature of the mixture was elevated to 70° C. and the polymerization of propylene was then carried out for 2 hours. The pressure was kept at 7 kg/cm²G during the polymerization. After completion of the polymerization, a slurry containing the resulting solid was filtered to separate white powder and a liquid phase from each other. In reference to the white polymer powder dried, it was found that the yield was 328.2 g, boiling heptane extraction residue was 98.66%, MFR was 6.9 dg/min and the apparent bulk density was 0.43 g/ml. The liquid phase was concentrated to obtain 1.1 g of a solvent-soluble polymer. Accordingly, the activity was 22,000 g-pp/mmol-Ti and the toal II (t.I.I.) was 98.4%.

Mw/Mn measured by GPC (gel permeation chromatography) was 4.44.

EXAMPLE 2

The pretreatment of the catalyst component [A] was repeated in the same manner as in Example 1 except that 10 mmol of IPAMP was used in the pretreatment of the solid titanium catalyst component [A], and thus obtained a pre-treated catalyst component [A²]. Subsequently, the polymerization of propylene was repeated in the same manner as in Example 1 except that the catalyst component [A²] obtained by the above-described pretreatment of was used. There were obtained such results that the activity was 21,700 g-pp/mmol-Ti, t-II was 98.3%, MFR of white powder was 4.9 and the apparent bulk density was 0.46 g/ml.

EXAMPLE 3

(Preparation of solid titanium catalyst component [B¹])

A mixture of 95.2 g of anhydrous magnesium chloride, 442 ml of decane and 390.6 g of 2-ethylhexyl alcohol were reacted with heating at 130° C. for 2 hours to prepare a homogeneous solution. To the homogeneous solution was added 21.3 g of phthalic anhydride, and the mixture was stirred at 130° C. for one hour to dissolve phthalic anhydride in the homogeneous solution. The thus-obtained homogeneous solution was cooled to room temperature, and 75 ml of the homogeneous solution was added dropwise to 200 ml of titanium tetrachloride kept at –20° C. over a period of one hour. After completion of the addition, the temperature of the mixed solution was elevated to 110° C. over a period of 4 hours. When the temperature reached 110° C., 4.79 ml of 2-isopropyl-2-isopentyl-1,3-dimethoxypropane (IPAMP) was added thereto, and the mixture was held with stirring at that temperature for 2 hours. After completion of the 2-hour reaction, the resulting solid was collected by hot filtration and re-suspended in 275 ml of titanium tetrachloride. The mixture was again reacted with heating at 110° C. for 2 hours. After completion of the reaction, the solid was collected by hot filtration and thoroughly washed with decane and hexane kept at 110° C. until no free titanium compound was detected in the washing liquid. The solid titanium catalyst component [B¹] prepared above was stored as a decane slurry. A part thereof was dried to examine the catalyst composition. It was found that the thus-obtained solid titanium catalyst component [B¹] contained 2.3% by weight of titanium, 63% by weight of chlorine, 22% by weight of magnesium and 9.8% by weight of IPAMP.

(Polymerization)

Into an autoclave was introduced 750 ml of purified hexane. Into the autoclave were then introduced 0.75 mmol, in terms of aluminum atom, of a compound (hereinafter abbreviated to mixed Al) composed of a mixture of triisobutyl-aluminum and ethylaluminum sesquichloride (2:1 by mol in terms of aluminum atom) and 0.0075 mmol, in terms of titanium atom, of the above-described titanium catalyst component in a propylene atmosphere at 40° C.

After the mixture was heated to 60° C., 150 ml of hydrogen was introduced, the temperature of the mixture was elevated to 70° C. and the polymerization of propylene was then carried out for 2 hours. The pressure was kept at 7 kg/cm²G during the polymerization. After completion of the polymerization, a slurry containing the resulting solid was filtered to separate white powder and a liquid phase from each other. The white polymer powder was dried and by using the dried powder, it was found that the yield was 398.2 g, boiling heptane extraction residue was 97.47%, MFR was 1.2 dg/min and the apparent bulk density was 0.45 g/ml. The liquid phase was concentrated to obtain 2.9 g of a solvent-soluble polymer. Accordingly, the activity was 53,500 g-pp/mmol-Ti, and the overall II (t.I.I.) was 96.8%.

COMPARATIVE EXAMPLES 1

The polymerization of propylene was repeated in the same manner as In Example 3 except that triethylaluminum was used in place of the mixed Al used in the polymerization of Example 3.

The results are shown in Table 1.

EXAMPLE 4

(Preparation of solid titanium catalyst component [B²])

A high-speed mixer having an internal volume of 2 liter (manufactured by Tokushu Kika Kogyo KK) was thoroughly purged with $N_2$, and 700 ml of refined kerosine, 10 g of commercial available $MgCl_2$, 24.2 g of ethanol and 3 g of Emasol 320 (sorbitan distearate, a product of Kao-Atlas KK) were placed therein. While stirring the mixture, the temperature thereof was elevated and the mixture was stirred at 120° C. and 800 rpm for 30 minutes. Under the high-speed stirring, the resulting, solution was transferred to a 2-liter glass flask (equipped with a stirrer) which was previously charged with 1 liter of refined kerosine cooled to –10° C. by using a Teflon tube having an inner diameter of 5 mm under high-speed stirring. The resulting solid was collected by filtration and thoroughly washed with hexane to obtain a carrier.

In 150 ml of titanium tetrachloride was placed 7.5 g of said carrier at room temperature. After the temperature of the mixture was elevated to 40° C., 1.33 ml of 2-isopropyl-2-isopentyl-1,3-dimethoxypropane was added thereto, and the temperature of the mixture was then elevated to 100° C. After the mixture was stirred at 100° C. for 2 hours, the resulting solid was collected by filtration and re-suspended in 150 ml of titanium tetrachloride, and the suspension was stirred at 130° C. for 2 hours. The reaction solid was collected from the reaction mixture by filtration and thoroughly washed with a sufficient amount of purified hexane to obtain a solid catalyst component [B²]. The component in terms of atom contained 3.1% by weight of titanium, 58% by weight of chlorine, 17% by weight of magnesium and 19.7% by weight of 2-isopropyl-2-isopentyl-1,3-dimethoxypropane.

(Polymerization)

The polymerization of propylene was repeated in the same manner as in Example 3 except that the solid titanium catalyst component [B²] was used in place of the solid titanium catalyst component [B¹].

The results are shown in Table 1.

EXAMPLES 5 AND 6

The polymerization of propylene was repeated in the same manner as in Example 4 except that 0.075 mmol of cyclohexylmethyldimethoxysilane (CMMS) (Example 5) or 2-isopropyl-2-isopentyl-1,3-dimethoxypropane (IPAMP) (Example 6) as the electron donor was added in the polymerization of Example 4.

The results are shown in Table 1.

COMPARATIVE EXAMPLES 2 AND 3

The polymerization of propylene was repeated in the same manner as in Example 5 and 6 except that triisobutylaluminum was used in place of the mixed Al used in Examples 5 and 6.

The results are shown in Table 1.

EXAMPLE 7

(Preparation of solid titanium catalyst component [$B^3$])

A solid titanium catalyst component [$B^3$] was prepared in the same manner as in Example 3 except that diisobutyl phthalate (DIBP) was used in place of IPAMP used in the preparation of the solid titanium catalyst component of Example 3. The resulting catalyst component contained, on a weight basis, 2.4% of titanium, 20% of magnesium, 60% of chlorine and 13.0% of DIBP.

Prepolymerization of solid titanium catalyst component [$B^3$]

To a 400 ml four-necked glass reactor equipped with a stirrer were added 100 ml of purified hexane, 10 mmol of triethylaluminum, 1 mmol of 2-isopropyl-2-isopentyl-1,3-dimethoxypropane and 1.0 mmol, in terms of Ti atom, of the above solid Ti catalyst component [$B^3$] in a nitrogen atmosphere. Propylene at a rate of 3.2 Nl/hr at 20° C. was fed to the reactor for one hour. When the feed of propylene was completed, the reactor was purged with nitrogen gas, followed by removal of the supernatant. The solid was washed by a washing treatment consisting of adding purified hexane to resuspend the solid and leaving to stand followed by removal of supernatant. The solid was re-suspended in purified hexane and the whole amount of the suspension was transferred to a catalyst bottle.

(Polymerization)

The polymerization of propylene was repeated in the same manner as in Example 3 except that the prepolymerized solid titanium catalyst component [$B^3$] was used in place of the solid titanium catalyst component [$B^1$] used in the polymerization of Example 3.

The results are shown in Table 1.

COMPARATIVE EXAMPLE 4

The polymerization of propylene was repeated in the same manner as in Example 3 except that triethylaluminum was used in place of the mixed Al used in the polymerization of Example 3.

EXAMPLE 8

(Preparation of solid titanium catalyst component [$B^4$])

A solid titanium catalyst component [$B^4$] was prepared in the same manner as in Example 4 except that an equimolar amount of diisobutyl phthalate (DIBP) was used in place of IPAMP used in the preparation of the solid titanium catalyst component of Example 4. The resulting catalyst component contained, on a weight basis, 2.3% of titanium, 17% of magnesium, 63% of chlorine and 5.5% of DIBP.

(Prepolymerization of solid titanium catalyst component [$B^4$])

To a 400 ml four-necked glass reactor equipped with a stirrer were added 100 ml of purified hexane, 10 mmol of triethylaluminum, 1 mmol of 2-isopropyl-2-isopentyl-1,3-dimethoxypropane and 1.0 mmol, in terms of Ti atom, of the above solid titanium catalyst component [$B^4$] in a nitrogen atmosphere. Propylene at a rate of 3.3 Nl/hr was fed to the reactor at 20° C. for one hour. When the feed of propylene was completed, the reactor was purged with nitrogen gas, followed by removal of the supernatant. The solid was washed two times by a washing treatment consisting of adding purified hexane to resuspend the solid and leave to stand followed by removal of supernatant. The solid was re-suspended in purified hexane and the whole amount of the suspension was transferred to a catalyst bottle.

(Polymerization)

The polymerization of propylene was repeated in the same manner as in Example 3 except that the solid titanium catalyst component [$B^4$] was used in place of the solid titanium catalyst component [$B^1$] used in the polymerization of Example 3.

The results are shown in Table 1.

COMPARATIVE EXAMPLE 5

The polymerization of propylene was repeated in the same manner as in Example 3 except that triethylaluminum was used in place of the mixed Al used in the polymerization of Example 3.

The results are shown in Table 1.

TABLE 1

| Example No. | Electron donor | Activity g-pp/mmolTi | t-II % | MFR dg/min | Apparent bulk density g/ml |
|---|---|---|---|---|---|
| Example 3 | — | 53,500 | 96.8 | 1.2 | 0.45 |
| Comp.Ex.1 | — | 46,800 | 97.2 | 1.9 | 0.44 |
| Example 4 | — | 48,300 | 98.2 | 1.4 | 0.40 |
| Example 5 | CMMS | 50,600 | 98.4 | 1.6 | 0.42 |
| Example 6 | IPAMP | 49,300 | 98.8 | 1.7 | 0.36 |
| Comp.Ex.2 | CMMS | 33,100 | 98.3 | 2.6 | 0.38 |
| Comp.Ex.3 | IPAMP | 27,600 | 98.3 | 3.2 | 0.14 |
| Example 7 | — | 35,400 | 98.0 | 4.8 | 0.45 |
| Comp.Ex.4 | — | 30,900 | 98.6 | 3.5 | 0.45 |
| Example 8 | — | 44,200 | 97.4 | 4.5 | 0.42 |
| Comp.Ex.5 | — | 27,800 | 98.6 | 2.9 | 0.48 |

EXAMPLE 9

The solid titanium catalyst component [A] was used and prepolymerized by the following procedure to obtain a prepolymerized polyolefin-containing catalyst ($C^1$).

(Prepolymerization of solid titanium catalyst component [A])

To a 400 ml four-necked glass reactor equipped with a stirrer were added 100 ml of purified hexane, 10 mmol of triethylaluminum, 2 mmol of 2-isopropyl-2-isopentyl-1,3-dimethoxypropane (IPAMP) and 1.0 mmol, in terms of Ti atom, of the above solid Ti catalyst component [A]. Propylene at a rate of 3.2 Nl/hr was fed to the reactor at 20° C. for one hour. When the feed of propylene was completed, the reactor was purged with nitrogen gas, followed by removal of the supernatant. The solid was washed two times by a washing treatment consisting of adding purified hexane to re-suspend the solid and leaving to stand followed by removal of supernatant. The solid was re-suspended in purified hexane and the whole amount of the suspension was transferred to a catalyst bottle. Thus, the prepolymerized olefin-containing catalyst [$C^1$] was obtained.

(Polymerization)

Into an autoclave having an internal volume of 2 liter was charged 750 ml of purified hexane. Into the autoclave were then charged 0.75 mmol of triethylaluminum and 0.015 mmol, in terms of titanium atom, of the prepolymerized olefin-containing catalyst [$C^1$] obtained above in a propylene atmosphere at 60° C.

Into the autoclave was introduced 200 ml of hydrogen, the temperature of the mixture was elevated to 70° C. and the polymerization of propylene was then carried out for 2 hours. The pressure was kept at 7 kg/cm²G during the polymerization. After completion of the polymerization, a slurry containing the resulting solid was filtered to separate white powder and a liquid phase from each other. After drying the resulting white polymer powder, it was found by using the dryed powder that the yield was 400.6 g, boiling heptane extraction residue was 98.94%, MFR was 3.4 dg/min and the apparent bulk density was 0.45 g/ml. The liquid phase was concentrated to obtain 1.5 g of a solvent soluble polymer. Accordingly, activity was 26,800 g-pp/mmol-Ti, and the toal II (t.I.I.) was 98.6%.

EXAMPLE 10

A prepolymerized olefin-containing catalyst [$C^2$] was obtained in the same manner as in Example 9 except that 1 mmol of IPAMP was used in the prepolymerization of Example 9.

Subsequently, the polymerization of propylene was carried out in the same manner as in Example 9 except that the prepolymerized olefin-containing catalyst [$C^2$] was used in place of the prepolymerized olefin-containing catalyst [$C^1$].

The results are shown in Table 2.

Mw/Mn measured by GPC was 4.79.

EXAMPLE 11

A prepolymerized olefin-containing catalyst [$C^3$] was obtained in the same manner as in Example 9 except that 0.5 mmol of IPAMP was used in the prepolymerization of Example 9.

Subsequently, the polymerization of propylene was carried out in the same manner as in Example 9 except that the prepolymerized olefin-containing catalyst [$C^3$] and further 0.075 mmol of IPAMP were used.

The results are shown in Table 2.

EXAMPLES 12 AND 13

The polymerization of propylene was carried out in the same manner as in Example 11 except that the prepolymerized olefin-containing catalyst [$C^1$] or [$C^2$] was used.

The results are shown in Table 2.

EXAMPLE 14

(Preparation of solid titanium catalyst component [$C^4$])

A high-speed mixer having an internal volume of 2 liter (manufactured by Tokushu Kika Kogyo KK) was thoroughly purged with $N_2$, and 700 ml of refined kerosine, 10 g of commercially available $MgCl_2$, 24.2 g of ethanol and 3 g of Emasol 320 (sorbitan distearate, a product of Kao-Atlas KK) were placed therein. While stirring the mixture, the temperature of the mixture was elevated and the mixture was stirred at 120° C. and 800 rpm for 30 minutes. Under high-speed stirring, the resulting solution was transferred to a 2-liter glass flask (equipped with a stirrer) which was previously charged with 1 liter of refined kerosine cooled to −10° C. by using a Teflon tube having an inner diameter of 5 mm. The resulting solid was collected by filtration and thoroughly washed with hexane to obtain a carrier.

In 150 ml of titanium tetrachloride was suspended 7.5 g of said carrier at room temperature. After the temperature of the suspension was elevated to 40° C., 1.3 ml of diisobutyl phthalate (DIBP) was added thereto and the temperature of the, mixture was elevated to 100° C. After the mixture was stirred at 100° C. for 2 hours, the resulting solid was collected by filtration and re-suspended in 150 ml of titanium tetrachloride, and the suspension was stirred at 130° C. for 2 hours. The reaction solid was collected from the reaction mixture by filtration and thoroughly washed with a sufficient amount of purified hexane to obtain a solid titanium catalyst component [$C^4$]. The component in terms of atom contained 2.3% by weight of titanium, 63% by weight of chlorine, 20% by weight of magnesium and 5.5% by weight of DIBP.

(Prepolymerization of solid titanium catalyst component [$C^4$])

To a 400 ml four-necked glass reactor equipped with a stirrer were added 100 ml of purified hexane, 10 mmol of triethylaluminum, 2 mmol of 2-isopropyl-2-isopentyl-1,3-dimethoxypropane and 1.0 mmol, in terms of Ti atom, of the above solid titanium catalyst component [$C^4$] in a nitrogen atmosphere. Propylene at a rate of 3.3 Nl/hr at 20° C. was fed to the reactor for one hour. When the feed of propylene was completed, the reactor was purged with nitrogen gas, followed by removal of the supernatant. The solid was washed two times by a washing treatment consisting of adding purified hexane to re-suspend the solid and leaving to stand followed by removal of supernatant. The solid was re-suspended in purified hexane. The whole amount of the suspension was transferred to a catalyst bottle. In this way, the prepolymerized olefin-containing catalyst [$C^4$] was obtained.

(Polymerization)

The polymerization of propylene was carried out in the same manner as in Example 9 except that the prepolymerized olefin-containing catalyst [$C^4$] obtained above was used.

The results are shown in Table 2.

Mw/Mn measured by GPC was 4.48.

EXAMPLE 15

The polymerization of propylene was carried out in the same manner as in Example 11 except that the prepolymerized olefin-containing catalyst [$C^4$] was used.

The results are shown in Table 2.

Mw/Mn measured by GPC was 4.72.

TABLE 2

| Example No. | Electron donor | Activity g-pp/mmolTi | t-II % | MFR dg/min | Apparent bulk density g/ml |
|---|---|---|---|---|---|
| 9  | —     | 26,800 | 98.6 | 3.4 | 0.45 |
| 10 | —     | 30,900 | 98.6 | 3.5 | 0.45 |
| 11 | IPAMP | 23,400 | 98.9 | 5.0 | 0.45 |
| 12 | IPAMP | 30,500 | 99.0 | 3.5 | 0.45 |
| 13 | IPAMP | 31,600 | 98.9 | 2.7 | 0.46 |
| 14 | —     | 27.800 | 98.6 | 2.9 | 0.48 |
| 15 | IPAMP | 25,000 | 98.8 | 3.4 | 0.47 |

EXAMPLE 16

Buten-1 was polymerized by the following procedure wherein the prepolymerized polyolefin-containing catalyst ($C^1$) was used.

(Polymerizetion)

Into an autoclave having an internal volume of 2 l was charged 500 ml of n-hexane in a nitrogen atmosphere. After the system in the autoclave was made at a temperature of −50° C., into the autoclave were then introduced 500 ml of liquid buten-1, 2.0 mmol of triethylalminium, 0.2 mmol of 2-isopropyl-2-isopentyl-1,3-dimethoxypropane (IPAMP) and 100 ml of hydrogen. After the temperature of the mixture was elevated to 60° C., 0.01 mmol, in terms of titanium atom, of the prepolymerized polyolefin-containing catalyst (Cl) was added into the mixture to inisiate the polymerizetion of butene-1. After the polymerization of buten-1 was carried out for 1 hours, methanol was added into the reaction mixture to stop the polymerization and then the unreacted butene-1 was removed. Reaction mixture was introduced into large amount of methanol to obtain white solid. The resulting white solid was ground by a mixer, washed with methanol and dried under a reduced pressure to obtain butene-1 polymer.

The polymerization activity, the isotactic index (the ratio of the insoluble component in n-decane at 3° C., hereinafter reffered as II), MFR, the intrinsic viscosity [TI] in decaline at 135° C. of the butene-1 polymer obtained are shown in Table 3

EXAMPLE 17

Butene-1 was polymerized by the following procedure wherein the prepolymerized polyolefin-containing catalyst ($C^1$) was used.

(Polymerizetion)

After an autoclave having an internal volume of 2 l was cooled to −50° C., into the autoclave was charged 500 ml of liquid buten-1, 1.0 mmol of triethylalminium, 0.1 mmol of 2-isopropyl-2-isopentyl-1,3-dimethoxypropane, 0.01 mmol, in termes of titanium atom, of the prepolymerized polyolefin-containing catalyst ($C^1$) and 400 ml of hydrogen, and then the system was elevated to 30° C. After the polymerization of buten-1 was carried out for 2 hours at 30° C., methanol was added into the reaction mixture to stop the polymerization and then the unreacted butene-1 was removed. The resulting white solid was washed with methanol to obtain butene-1 polymer.

The polymerization activity, II, MFR, the intrinsic viscosity [η] of the butene-1 polymer obtained are shown in Table 3

COMPARATIVE EXAMPLE 6

The preparation of the solid titanium catalyst component was repeated in the same manner as in Example 1 except that 1.0 mmol of diphenylmethoxysilane (DPMS) was used in the pretreatment of the solid titanium catalyst component [D]. Subsequently, the prepolymerization was repeated in the same manner as in Example 9 except that the solid titanium catalyst component [D] was used to obtain a prepolymerized polyolefin-containing catalyst (D).

The polymerization of buten-1 was repeated as same manner in Example 16 except that the prepolymerized polyolefin-containing catalyst (D) was used in place of the prepolymerized catalyst ($C^1$), tri-isobutylalminium was used in place of triethylalminium and DPMS was used in place of IPAMP.

Results are shown in Table 3.

TABLE 3

| | Activity g/mmol Ti | II % | MFR dg/min. | [η] dl/g |
|---|---|---|---|---|
| Example 16 | 17,700 | 100 | 0.07 | 3.74 |
| Example 17 | 11,200 | 98.9 | 0.08 | 3.80 |
| Comp.Ex. 6 | 7,700 | 99.6 | 3.67 | |

EXAMPLE 18

The following prepolymerization was carried out by using the solid titanium catalyst component [$B^2$] prepared in Example 4.

(Prepolymerization of the solid titanium catalyst component [$B^2$])

To a 400 ml four-necked glass reactor equipped with a stirrer were added 100 ml of purified hexane, 10 mmol of triethylaluminum, 1 mmol of 2-isopropyl-2-isopentyl-1,3-dimethoxypropane and 1.0 mmol, in terms of Ti atom, of the above solid titanium catalyst component [$B^2$] in a nitrogen atmosphere. Propylene at a rate of 2.5 Nl/hr was fed to the reactor at 20° C. for one hour. When the feed of propylene was completed, the reactor was purged with nitrogen gas, followed by removal of the supernatant. The solid was washed two times by a washing treatment consisting of adding purified hexane to resuspend the solid and leave to stand followed by removal of supernatant. The solid was re-suspended in purified hexane and the whole amount of the suspension was transferred to a catalyst bottle to obtain the prepolymerized polyolefin-containing catalyst ($C^5$).

(Polymerizetion)

Into a glass reacter having an internal volume of 1 litter was charged 500 ml of 4-methyl-1-pentene in a nitrogen atmosphere and then the temperature in the reacter was elevated to 50° C. Into the reacter, was introduced 0.5 mmol of triethylalminium and 0.05 mmol of cyclohexylmethyldimethoxysilane (CMMS), and further, 0.01 mmol, in termes of titanium atom, of the prepolymerized polyolefin-containing catalyst ($C^5$) was added in to the mixture to initiate the polymerization of 4-methyl-l-pentene. After the polymerization of 4-methyl-l-pentene was carried out for 1 hours, methanol was added into the reaction mixture to stop the polymerization. The resulting white solid was filtrated off, washed with methanol and dried in a reduced pressure to obtain 2.9 g of 4-methyl-1-pentene polymer. The polymerizaiton activity was 290 g/mmol Ti.

EXAMPLE 19

The polymerization of 4-methyl-1-pentene was repeated in the same manner as in Example 18 except that IPAMP was used in place of CMMS to obtain 9.86 g of 4-methyl-1-pentene polymer. The polymerization activity was 990 g/mmol Ti.

EXAMPLES 20 AND 21

(Prepolymerization of solid titanium catalyst component [$B^1$]

A prepolymerized olefin-containing catalyst ($C^6$) was obtained in the same manner as in Example 9 except that 1 mmol, in terms of titanium atom, of the solid catalyst component [$B^1$] and 3 mmol of triethylaluminum were used in the prepolymerization of Example 9 without using IPAMP.

(polymerization)

The polymerization of propylene was carried out in the same manner as in Example 9 except that 0.0075 mmol, in terms of titanium atom, of the prepolymerized olefin-containing catalyst (C⁶) was used in place of the prepolymerized olefin-containing catalyst (C¹), 150 ml of hydrogen was used and 0.075 mmol of IPAMP (Example 20) or 0.075 mmol of cyclohexylmethyl-dimethoxysilane (CMMS) (Example 21) as an electron donor was used in the polymerization of Example 9.

The results are shown in Table 4.

EXAMPLE 22

(polymerization)

The polymerization of propylene was carried out in the same manner as in Example 20 except that 300 ml of hydrogen and 0.075 mmol of dicyclopentyldimethoxysilane (DCPMS) as an electron donor were used in the polymerization of Example 20.

The results are shown in Table 4.

EXAMPLE 23

(polymerization)

The polymerization of propylene was carried out in the same manner as in Example 20 except that triisobutylaluminum was used in place of triethylaluminum in the polymerization of Example 20.

The results are shown in Table 4.

EXAMPLE 24

The polymerization of propylene was carried out in the same manner as in Example 20 except that 0.50 mmol of triisobutylaluminum and 0.25 mmol of ethylaluminum sesquichloride were used in place of triethylaluminum in the polymerization of Example 20.

The results are shown in Table 4.

TABLE 4

|  | Electron Donor | Activity g/mmol Ti | I I % | MFR g/min. | Apparent bulk density g/ml |
|---|---|---|---|---|---|
| Example 20 | IPAMP | 49,600 | 98.8 | 1.7 | 0.44 |
| Example 21 | CMMS | 48,500 | 98.5 | 1.5 | 0.43 |
| Example 22 | DCPMS | 59,900 | 98.1 | 5.3 | 0.45 |
| Example 23 | IPAMP | 47,700 | 98.8 | 1.3 | 0.43 |
| Example 24 | IPAMP | 51,100 | 98.6 | 1.7 | 0.44 |

EXAMPLE 25

(polymerization)

The polymerization of butene-1 was carried out in the same manner as in Example 16 except that 1.0 mmol of triethylaluminum, 0.1 mmol of IPAMP and 0.0025 mmol, in terms of titanium atom, of the prepolymerized olefin containing catalyst (C²) were used in the polymerization of Example 16.

The results are shown in Table 5.

EXAMPLE 26

(Polymerization)

The polymerization of propylene was carried out in the same manner as in Example 16 except that the prepolymerized olefin-containing catalyst (C⁶) was used in place of the prepolymerized olefin-containing catalyst [C¹] and further 200 ml of hydrogen was used.

The results are shown in Table 5.

TABLE 5

|  | Activity g/mmol Ti | I I % | MFR (load at 10 Kg) dg/min. | [η] dl/g |
|---|---|---|---|---|
| Example 25 | 34,800 | 98.7 | 3.7 | 3.28 |
| Example 26 | 51,500 | 98.6 | 4.5 | 3.29 |

What is claimed is:

1. A method of olefin polymerization comprising:
   main polymerizing α-olefin in the presence of an olefin polymerization catalyst which comprises
   (Ib-IIa-IIIa) a prepolymerized olefin-containing catalyst,
   (IIa) an organoaluminum compound catalyst component, and
   (IIIb) an electron donor which is a compound having at least two ether linkages represented by the following formula (A)

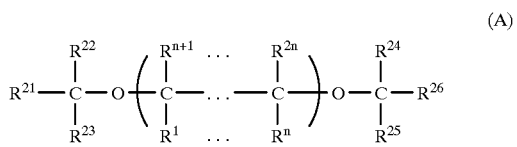

wherein
n is a integer and $2 \leq n \leq 10$,
$R^1$–$R^{26}$ are each a substituent having at least one element selected from the group consisting of carbon, hydrogen, oxygen, halogen, nitrogen, sulfur, phosphorus, boron and silicon, any two members of $R^1$–$R^{26}$ may together from a ring other than a benzene ring and the main chain of the compound may contain an atom other than carbon;

wherein said prepolymerized olefin-containing catalyst (Ib-IIa-IIIa) comprises
   (Ib) a solid titanium catalyst component containing titanium, magnesium, halogen and an electron donor other than a compound having at least two ether linkages represented by said formula (A),
   (IIa) an organoaluminum compound catalyst component,
   (IIIa) a compound having at least two ether linkages represented by said formula (A), and
   polyolefin prepared by preliminary polymerizing α-olefin of 2 to 20 carbon atoms; and
wherein said prepolymerized olefin-containing catalyst (Ib-IIa-IIIa) is prepared in a hydrocarbon solvent and then separated therefrom prior to utilization in said main polymerization.

2. The method of olefin polymerization as claimed in claim 1, wherein subsequent to separation from said hydrocarbon solvent, said prepolymerized olefin-containing catalyst (Ib-IIa-IIIa) is suspended in a hydrocarbon solvent and then separated therefrom prior to utilization in said main polymerization.

3. A method of olefin polymerization comprising:
   main polymerizing α-olefin in the presence of an olefin polymerization catalyst which comprises
   (Ib-IIa-IIIa) a prepolymerized olefin-containing catalyst,
   (IIa) an organoaluminum compound catalyst compound, (IIIb) an electron donor which is a compound represented by the following formula (B)

$$R_nSi(OR^1)_{4-n} \quad (B)$$

wherein
R and $R^1$ are each a hydrocarbon radical and $0 \leq n \leq 4$;

wherein said prepolymerized olefin-containing catalyst (Ib-IIa-IIIa) comprises
(Ib) a solid titanium catalyst component containing titanium, magnesium, halogen and an electron donor other than a compound having at least two ether linkages represented by the following formula (A)

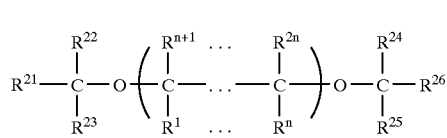

(A)

wherein
n is an integer and $2 \leq n \leq 10$,
$R^1$–$R^{26}$ are each a substituent having at least one element selected from the group consisting of carbon, hydrogen, oxygen, halogen, nitrogen, sulfur, phosphorus, boron and silicon, any two members of $R^1$–$R^{26}$ may together form a ring other than a benzene ring and the main chain of the compound may contain an atom other than carbon,
(IIa) an organoaluminum compound catalyst component,
(IIIa) a compound having at least two ether linkages represented by said formula (A), and
polyolefin prepared by preliminary polymerizing α-olefin of 2–20 carbon atoms; and wherein said prepolymerized olefin-containing catalyst (Ib-IIa-IIIa) is prepared in a hydrocarbon solvent and then separated therefrom prior to utilization in said main polymerization.

4. The method of olefin polymerization as claimed in claim 3, wherein subsequent to separation from said hydrocarbon solvent, said prepolymerized olefin-containing solvent, said prepolymerized olefin-containing catalyst (Ib-IIa-IIIa) is suspended in a hydrocarbon solvent and then separated therefrom prior to utilization in said main polymerization.

* * * * *